United States Patent [19]
Salmon et al.

[11] Patent Number: 5,355,373
[45] Date of Patent: Oct. 11, 1994

[54] ELECTRIC MOTOR, CONTROLLER THEREFOR AND METHODS FOR CONTROLLING AND ASSEMBLING SAME

[75] Inventors: Michael E. Salmon, Spartanburg, S.C.; David L. Ehle, Attica; Jeffrey G. Hovis, Lapeer, Mich.

[73] Assignee: Nu-Tech and Engineering, Inc., Lapeer, Mich.

[21] Appl. No.: 910,107

[22] PCT Filed: May 11, 1992

[86] PCT No.: PCT/US92/03907

§ 371 Date: Jul. 6, 1992

§ 102(e) Date: Jul. 6, 1992

Related U.S. Application Data

[63] Continuation-in-part of Ser. No. 696,014, May 9, 1991.

[51] Int. Cl.$^5$ .......................... H01F 7/08; H02K 21/12
[52] U.S. Cl. ........................... 310/71; 310/68 R; 310/156; 310/254; 29/597
[58] Field of Search ............. 310/71, 311, 40 MM, 310/42, 49 R, 49 A, 68 R, 77, 93, 156, 234, 254; 29/597; 318/63, 372; 335/272; 439/78

[56] References Cited

U.S. PATENT DOCUMENTS

| | | | |
|---|---|---|---|
| 3,110,830 | 4/1962 | Smith | 310/77 |
| 3,350,709 | 10/1967 | Pursiano et al. | 340/378 |
| 4,137,491 | 1/1979 | Bartley et al. | 318/685 |
| 4,358,694 | 11/1982 | Grundland | 310/67 R |
| 4,682,065 | 7/1987 | English et al. | 310/67 R |
| 4,686,400 | 8/1987 | Fujisaki et al. | 310/67 R |
| 4,890,027 | 12/1989 | Bohner et al. | 310/77 |
| 4,955,791 | 9/1990 | Wrobel | 310/67 R |
| 5,157,293 | 10/1992 | Escaravage | 310/71 |

OTHER PUBLICATIONS

Research Disclosure Oct. 1989, 30650 Surface Mount Coil Gage Mechanism, p. 732.

*Primary Examiner*—Steven L. Stephan
*Assistant Examiner*—D. R. Haszko
*Attorney, Agent, or Firm*—Brooks & Kushman

[57] ABSTRACT

A miniature electric motor is provided including stator and rotor assemblies wherein the rotor assembly has a magnet and a shaft adapted to be coupled to a load to move the load and wherein the magnet is positioned about the stator assembly for rotating without the stator assembly. The stator assembly includes a stator having a plurality of branches made of a magnetic material angularly positioned with respect to each other and a plurality of coils wound about their respective branches. The shaft extends through the stator and also, preferably, through a brake which supplies pressure to the rotor assembly to thereby supply a braking force to the rotor assembly after the load has been rotated to a desired position.

21 Claims, 19 Drawing Sheets

SAMPLE SENSOR OUTPUT SUBROUTINE

ELECTRIC MOTOR, CONTROLLER THEREFOR AND METHODS FOR CONTROLLING AND ASSEMBLING SAME

CROSS-REFERENCE TO RELATED APPLICATION

This application is a continuation-in-part of United States application Ser. No. 07/696,014, filed May 9, 1991, now abandoned.

TECHNICAL FIELD

The present application is related to electric motors, a controller therefor and methods for controlling and assembling the same and, in particular, to miniature electric motors and a controller therefor and methods for controlling and assembling the same.

Background Art

Miniature electric motors that can be rotated between fixed angles and held stationary at those fixed angles for a specified period of time are finding a wide variety of applications such as for driving needle indicators in meters, gauges and the like. For such motors to find wide application they must have high performance, be relatively low cost, and have a compact construction.

In the control of such motors it is desirable to maintain the position of a rotor of the motor at a specified location for a specified period of time. A stepper motor uses electromagnetic detents to maintain a rotor at a desired location. Electrical energy is added to cause the rotor to move past a magnetic hill. When the motor is deenergized, the rotor will settle and be maintained within a magnetic valley. A stepper motor is therefore designed with these magnetic valleys located at the desired stopping positions. Thus, one drawback of stepper motors is the requirement of a large number of detents in order to allow the stepper motor to be held at a large number of positions.

Another drawback of stepper motors is that as the motor settles in a magnetic valley, the motor shaft may vibrate before coming to rest at the desired location. This vibration could cause damage or excess wear to the motor or to a payload.

A micro-stepper motor offers an improvement over the stepper motor in that it allows a shaft to be held at an indefinite number of positions. The micro-stepper motor operates by applying electrically orthogonal signals to spatially orthogonal poles of a motor. By changing the ratio of magnitude of the signals applied, the motor can be moved to and held at any desired location. In order to hold the rotor at a desired location, however, electrical energy must be applied constantly. As a result, the performance of micro-stepper motors has been limited by the requirement of a corresponding increase in applied electrical energy for greater restraining torques.

These problems have been addressed by U.S. Pat. No. 4,890,027, to Bohner et al., which discloses a dynamic motor controller for a low cost motor. The position control of the motor is accomplished by the use of an electronic braking apparatus, which includes a piezoelectric transducer for applying a braking force to the rotor.

One attempt to surface mount a coil gauge mechanism is disclosed in Disclosure Number 30650, contained in Research Disclosure, October 1989. The gauge mechanism consists of surface mount coils and a permanent magnet spindle assembly. Attached to the spindle can be a dial pointer or other indicating device. The coils have a high permeability core and are wound with insulated copper wire for the coil. The rotational position of the spindle assembly permanent magnet is controlled by the amount and direction of electrical current in the surface mount coils. The mechanism is held in place by a bottom self-lubricating bearing and an upper bearing bracket. The upper bearing bracket also serves as a flux-containing package.

Summary of the Invention

It is an object of the present invention to provide a low cost, light-weight, compact motor which is relatively easy to control.

It is also an object of the present invention to provide a motor-controller combination which is low cost, efficient, compact and stable.

It is yet still another object of the present invention to provide a motor which can be surface-mounted on a substrate to provide a combination which is relatively easy to assemble using conventional automated equipment.

A further object of the present invention is to provide methods for controlling and assembling such electric motors.

In carrying out the above objects and other objects and features of the present invention, an electric motor for driving a load is provided. The motor .includes a stator assembly including a stator having a plurality of lobes. The stator includes at least one coil wound about at least one of the plurality of lobes and each coil has a pair of input leads. The motor also includes a rotor assembly including a magnet having a plurality of poles. The magnet is adapted to be coupled to the load and rotatably positioned relative to the stator assembly. The motor also includes means for electrically connecting the leads of the at least one coil to form an input terminal. The rotor assembly rotates relative to the stator assembly in response to a substantially continuously variable electrical signal applied to the input terminal to angularly position the rotor assembly to any one of a plurality of positions independent of stator geometry. In its preferred construction, the motor is a brushless dc motor. Control means for controlling movement of the load and for applying a substantially continuously variable electrical signal to the input terminal to rotate the rotor assembly relative to the stator assembly to any one of a plurality of angular positions may also be provided.

In further carrying out the above objects and other objects and features of the present invention, a method is provided for controlling an electric motor for driving a load, the motor having a stator assembly and a rotor assembly for rotating relative to the stator assembly. The method comprises the steps of providing a braking surface and providing the stator assembly with a magnetic permeability center offset from its electromagnetic center. The method also comprises energizing one of the two assemblies with at least one substantially continuously variable electrical signal, thereby producing an axial force between the two assemblies to move the rotor assembly away from the braking surface and producing a rotational force to rotate the rotor assembly to a desired position and deenergizing the one assembly thereby allowing the rotor assembly to move against the braking surface to hold the rotor assembly at the desired location.

The advantages accruing to the system of the present invention are numerous. For example, the motor construction results in a low-cost, efficient and compact motor which is relatively easy to control.

The above objects and other objects and features of the invention will be readily appreciated by one of ordinary skill in the art from the following detailed description of the best modes for carrying out the invention when taken in connection with the following drawings.

Best Modes For Carrying Out The Invention

Figure 1:
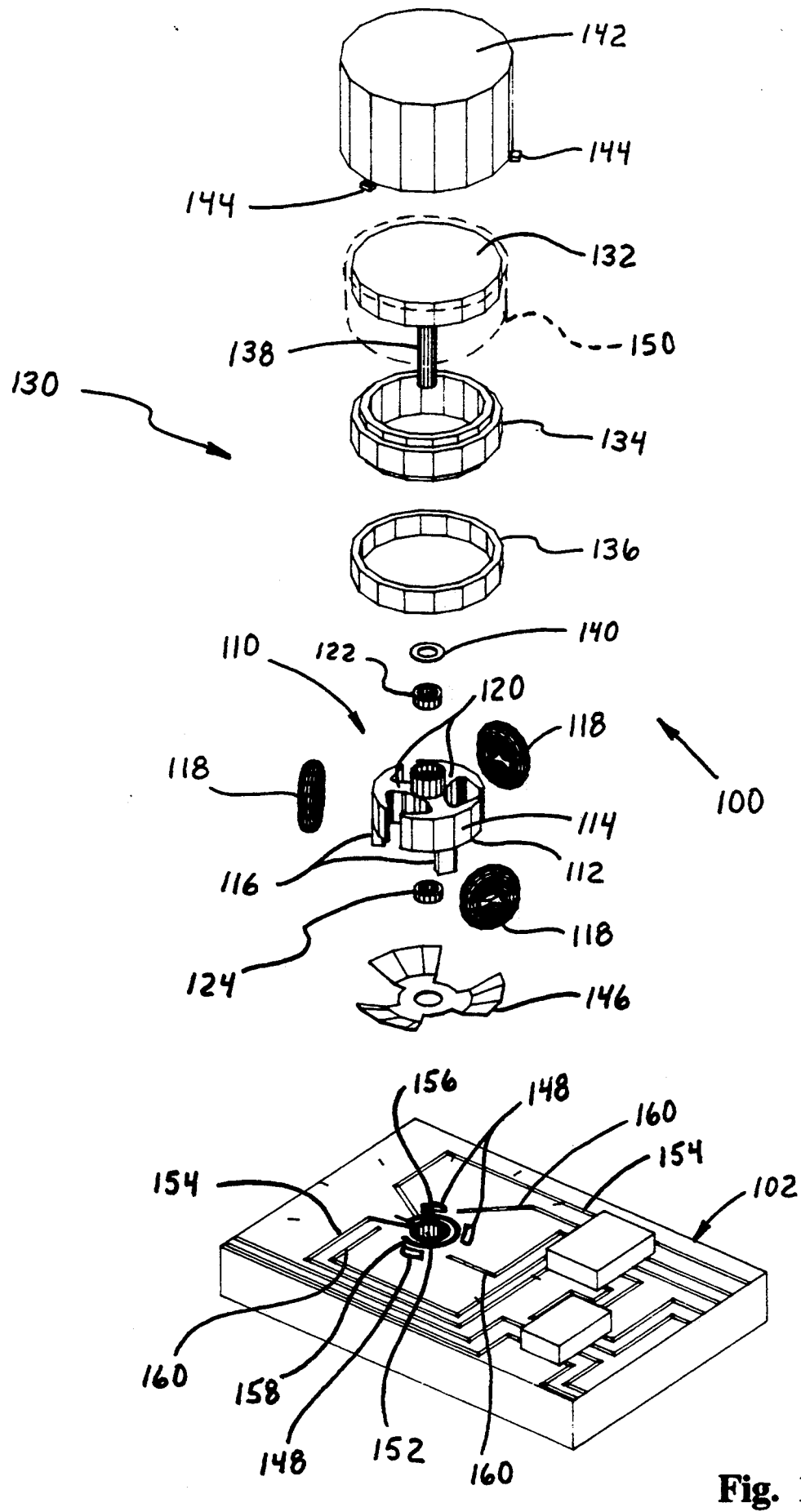
FIG. 1 is an exploded perspective view of an electric motor of the present invention and an associated substrate.

Referring now to FIG. 1, there is illustrated a motor, shown generally by reference numeral 100 and with respect to a substrate such as the back of a vacuum fluorescent display (VFD) unit 102. It is to be understood that the VFD unit 102 is not illustrated to scale.

The motor 100 can be generally described as a surface-mountable, brushless dc motor having a stator assembly shown generally by reference numeral 110. As shown, the stator assembly 110 includes an integrally formed stator 112 made of a ferromagnetic material and has a central portion with an aperture (not specifically illustrated) extending completely therethrough and three T-shaped equally-spaced, lobes or poles 114. In the preferred embodiment, the stator 112 is constructed of SAE 1005 carbon steel. The stator 112 has a diameter of 0.33" and is 0.32" long. As illustrated, each lobe 114 of the stator 112 includes a downwardly projecting mounting tab 116 which is received and retained on a corresponding pad 148 formed on the back of the VFD unit 102.

Figure 2A:
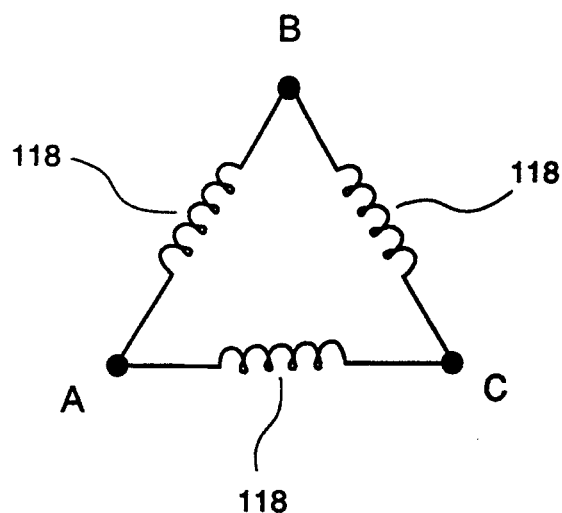
FIG. 2a is a schematic view of the coils of the motor shown in FIG. 1 connected in a Delta configuration.
Figure 2B:
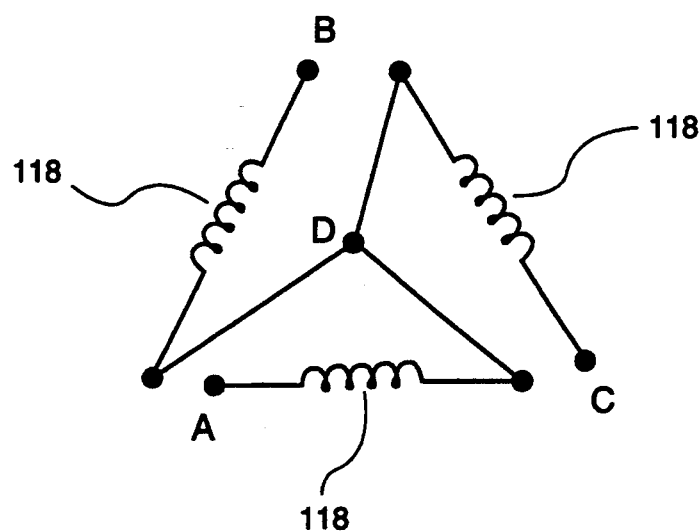
FIG. 2b is a schematic view of the coils of the motor shown in FIG. 1 connected in a Star configuration.
Figure 2C:
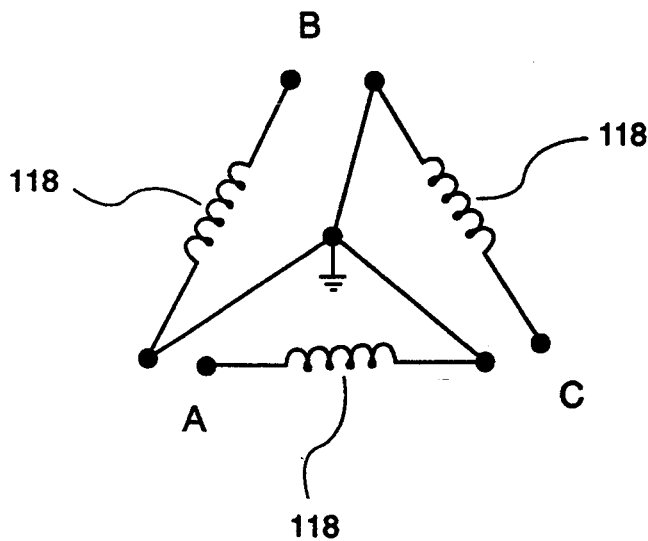
FIG. 2c is a schematic view of the coils of the motor shown in FIG. 1 connected in a Grounded-Star configuration.

As best shown in FIG. 1, three coils 118 are preferably wound on neck portions 120 of the lobes 114, thereby permitting the use of standard coil winding equipment. Referring now to FIGS. 2a–2c, the coils 118 can be electrically interconnected as a Delta connection, a Star connection or a Grounded-Star connection, respectively. Each type of connection offers a different level of motor control and efficiency. For example, a control voltage on any of the nodes A, B or C in a Delta connection affects all three coils, whereas a voltage on any of the nodes A, B or C in a Grounded-Star affects only one coil. Thus, it should be appreciated that the Grounded-Star offers the greatest level of flexibility in control strategy, and is more efficient than a Delta connection. Of course, instead of being grounded, the connection of FIG. 2c may be held at a predetermined reference level. The Delta connection of FIG. 2a, however, results in a higher torque for any given voltage. The torque can be as much as 50% higher for a similar voltage applied to the Star or Grounded-Star connection. Additionally, the Delta connection is easier to manufacture since there are fewer terminations and the coils 118 can be wound in a continuous fashion. In the preferred embodiment, therefore, a Delta connection is utilized.

Most preferably, each coil 118 is wound with approximately 150 turns of #38 AWG magnet wire, yielding a coil node resistance of approximately 5Ω when Delta connected. It should be appreciated that this construction results in a very low-cost and compact stator assembly 110. Additionally, since each of the coils 118 has a ferromagnetic core, the magnetic fields created when the coils 118 are energized are amplified. Consequently, the stator assembly 110 and therefore, the motor 100, has a low power consumption and high torque.

Figure 3:
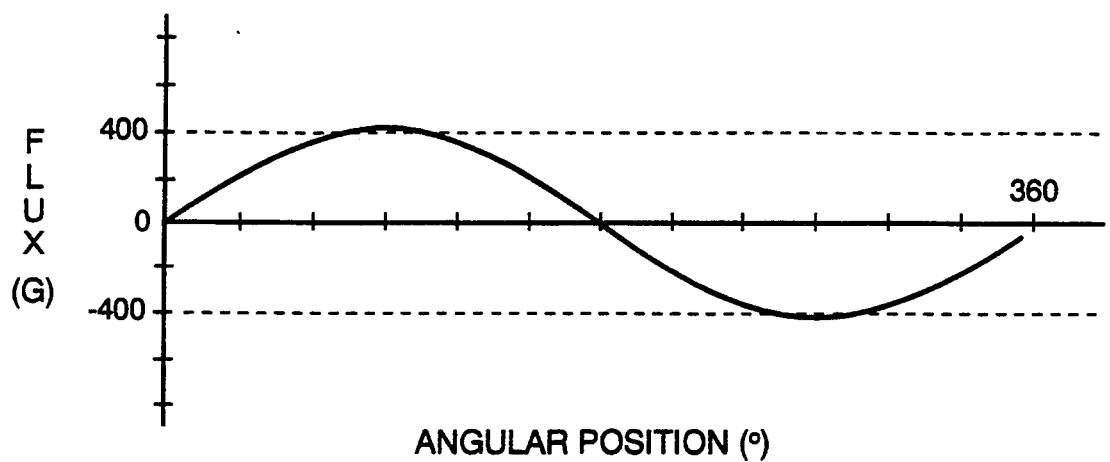
FIG. 3 is a graphical illustration of a nearly sinusoidal magnet flux profile for magnetizing the magnet of the motor shown in FIG. 1.

With continuing reference to FIG. 1, a rotor assembly, shown generally by reference numeral 13.0, includes a plastic cap 132, a magnet 134, an annular plastic ring 136 and a motor output shaft 138, all of which are secured together for rotation with respect to the stator assembly 110. Preferably, the magnet 134 is a ceramic magnet having a height of 0.40″ an inner diameter of 0.37″ and an outer diameter of 0.62″. Also preferably, the magnet 134 is magnetized through its diameter to produce North and South poles. To magnetize the magnet 134, a nearly sinusoidal magnet flux profile, shown in FIG. 3, was utilized. As illustrated in FIG. 3, the magnet flux profile preferably has a peak flux of about 400 gauss (with an empty core).

Figure 4:
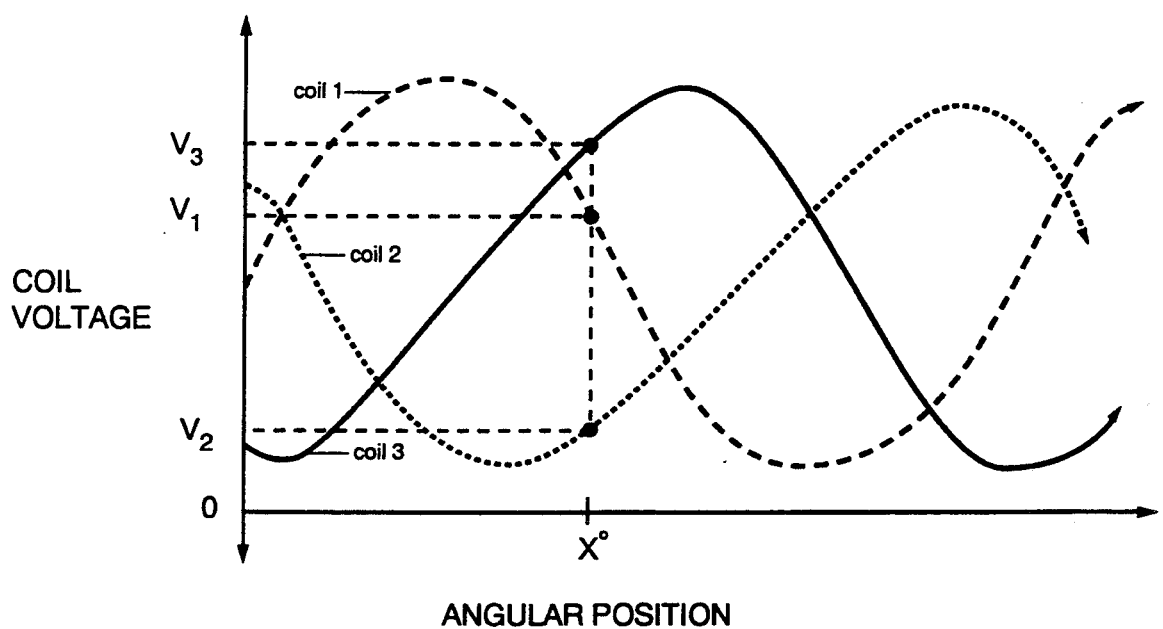
FIG. 4 is a graphical illustration of coil drive voltages, plotted versus angular position, for the coils shown in FIG. 1.

Referring now to FIG. 4, to accurately position the motor, the following coil voltages $V_1$, $V_2$ and $V_3$ are preferably applied to the coils 118:

$$V_1 - SIN(X) \qquad (1)$$

$$V_2 - SIN(X+120°) \qquad (2) \text{ and}$$

$$V_3 - SIN(X+240°) \qquad (3)$$

where "X°" represents the desired angular position from 0° to 360°. Thus, by applying various combinations of drive voltages to the coils 118, the angular position of the motor shaft 138 is essentially infinitely adjustable.

Coil voltages that are phase shifted by 120° work well the geometry of the coils 118. Although the drive voltages are shown to be generally sinusoidal, any other waveform, such as a square or triangle waveform, could be utilized. Preferably, peak drive current is approximately 0.25A per coil 118. Use of these drive voltages with the motor 100 constructed as disclosed herein yields output position linearity within 2°.

Figure 5:
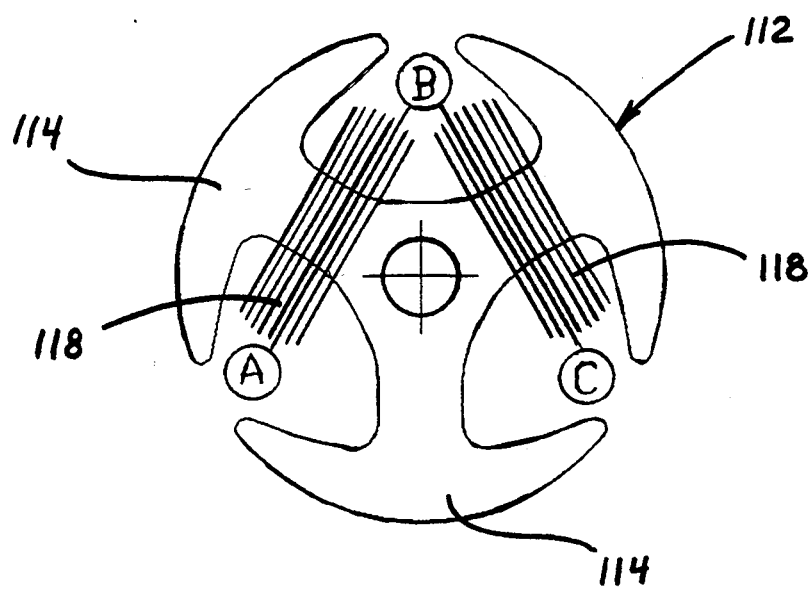
FIG. 5 is a partial plan view of an alternative stator assembly wherein there are fewer coils than stator lobes.

Referring now to FIG. 5, there is shown an alternative stator 112 and coil 118 assembly, wherein the number of stator lobes 114, or poles, exceeds the number of coils 118 wound thereabout. In this preferred embodiment, as illustrated, two coils 118 are wound about the three-lobed stator 112 and electrically connected at node "B". Of course, the two coils could be wound about any two of the lobes. It should be noted that although a third coil is absent, a third stator lobe is required for magnetic balancing.

The drive voltages for the stator/coil arrangement shown in FIG. 5 are preferably sinusoidal in shape and phase shifted from each other by about 120°, as previously described with respect to the motor embodiment shown in FIG. 1. Utilizing these drive voltages, the available angular sweep of the 2-coil embodiment remains a full 360°, although a reduced angular sweep is also possible. The torque delivered, however, is generally non-uniform. The reduction in the number of parts due to the absent coil and the reduced manufacturing time results in a cost savings. The 2-coil embodiment is thus ideal for use in an application which requires a reduced angular sweep, such as a fuel gauge in an automotive instrument cluster.

Figure 6:
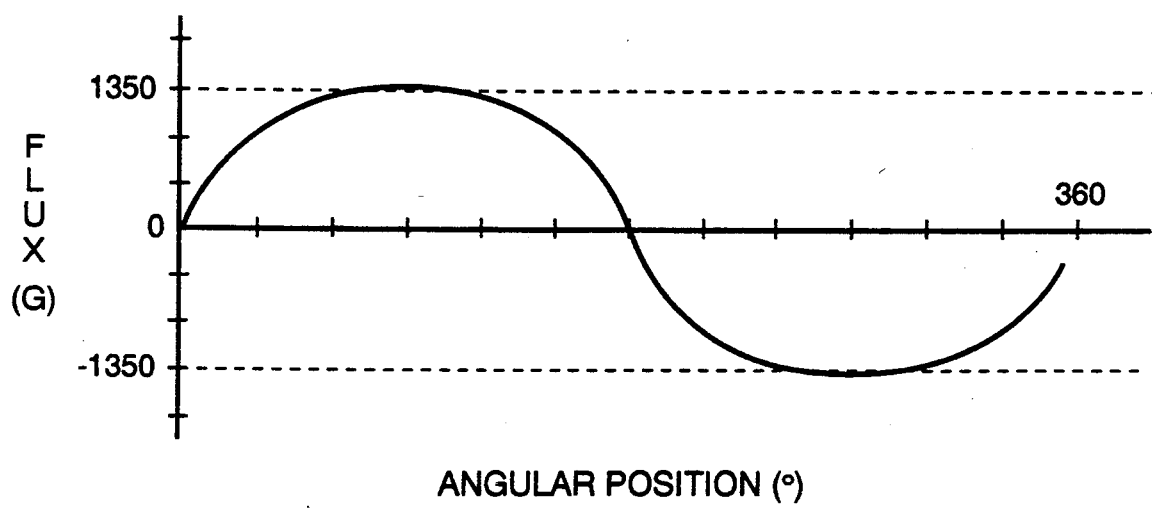
FIG. 6 is a graphical illustration of a nearly trapezoidal magnet flux profile for magnetizing, the magnet of the motor shown in FIG. 1.

Since some applications are best suited by a motor capable of producing a reduced set of output positions, or steps, the motor 100 may be constructed to provide such a reduced set of positions. For such an alternative application, the coils 118 are preferably wound about the stator lobes 114 with about 200 turns of #39 AWG wire, so as to yield node resistances of about 10A. The ceramic magnet 134 is preferably magnetized with an approximately trapezoidal flux profile, shown in FIG. 6. As illustrated in FIG. 6, the trapezoidal flux profile has a peak flux of approximately 1350 gauss.

Referring once again to FIG. 1, the magnet 134 is affixed to the plastic cap 132 on one face thereof and the plastic ring 136 is affixed to the other face of the magnet 134. The output shaft 138 is formed on or otherwise attached to the plastic cap 132 at the end thereof. The output shaft 138 is sized to extend through the magnet 134 and the plastic ring 136. Although the magnet 134 is shown to be a generally cylindrical magnet, the magnet could be constructed as a band or ring with a plurality of individual magnets disposed thereabout.

With continuing reference to FIG. 1, a thrust washer 140 is preferably positioned on the output shaft 138 between the plastic cap 132 and the stator assembly 110. A pair of optional press-in bushings 122 and 124 are also preferably positioned at the top and bottom of the stator 112, respectively, within its central aperture to help align the output shaft 138. In the preferred embodiment, when the motor 100 is assembled, the output shaft 138 extends through the thrust washer 140, the bushing 122, the aperture of the stator 112 and the bushing 124, such that the magnet 134 surrounds, or is without, the stator 112 and the coils 118 supported thereon and immediately adjacent thereto. This construction provides a compact closed magnetic circuit with a small air gap.

Due to the ferromagnetic nature of the stator 112, the magnet 134 generally centers itself on the magnetic center of the stator, which is at or slightly before the center of mass of the stator. This construction results in the motor 100 having an inherent, self-correcting position memory. This self-correcting feature allows the motor 100 to correct for any positioning problems every time the coils 118 are energized. Thus, positioning inaccuracies are remedied with the next position adjustment. Additionally, the motor 100 has a stable "off" (i.e. unpowered) position. These features give the motor 100 an advantage over stepper-type motors, which have inherent positioning problems.

In one preferred embodiment, a cap 142 encloses the assembled motor 100. As shown in FIG. 1, the cap 142 includes a plurality of mounting tabs 144, thereby permitting the motor 100 to be surface-mounted on the VFD unit 102 or some other substrate, such as a circuit board (not specifically illustrated), with the output shaft 138 extending therethrough as described below. The cap 142 is intended to function as both a magnetic flux concentrator for the magnet 134 and as a magnetic shield for the entire motor assembly, preventing external magnetic fields from adversely affecting motor performance and is constructed of an appropriate steel. The cap 142 serves the additional function of protecting the motor assembly from the environment, such as dust, dirt and the like.

Alternatively, an inverted cup-shaped cap 150, shown in phantom in FIG. 1, could be utilized in place of the cap 142 and plastic cap 132. In this preferred embodiment, the cap 150 is constructed of low carbon steel with the motor shaft 138 being formed thereon. Most preferably, the cap 150 is a unitary piece and is sized (e.g. 0.030" thick and approximately 0.500" long) to substantially enclose the magnet 134 and stator assembly 110 and the rotor assembly 130. Thus sized, the cap 150 provides protection for the motor assembly from the environment. Primarily, the cap 150 serves the dual functions of a magnetic flux guide and concentrator for the magnet 134, which is preferably press-fitted into the cap 150, and as an electromagnetic shield for the motor assembly, preventing external magnetic fields from affecting the performance of the motor 100.

With continuing reference to FIG. 1, the output shaft 138 also preferably extends through a piezoelectric brake 146 and the VFD unit 102. A glass tube 152 extends through the VFD unit 102, permitting the shaft 138 to extend therethrough while maintaining the vacuum within the VFD unit. When sized appropriately, the glass tube 152 also acts as a bearing to facilitate shaft rotation. Preferably, two conductive electrical traces 154 located on the VFD unit 102 provide power and ground to the piezoelectric brake 146 and, in one embodiment, ground to the coils 118, thereby allowing the motor 100 and brake 146 to be accurately controlled, as described in greater detail hereinbelow. One of the traces 154 defines a power ring 156 and the other trace defines a ground ring 158 for the piezoelectric brake 146. The brake 146 is typically soldered to the rings 156 and 158. Three other traces 160 supply power to the coils 118.

One of ordinary skill in the art could imagine many applications for the motor of the present invention. For many of these applications, the providing of electrical connections to the motor and the providing of a suitable bearing surface associated with the mounting or securing of the motor 100 to a suitable substrate is of significant importance. Since the motor 100 is a low torque, small motor, friction is, of course, a concern.

Figure 7:
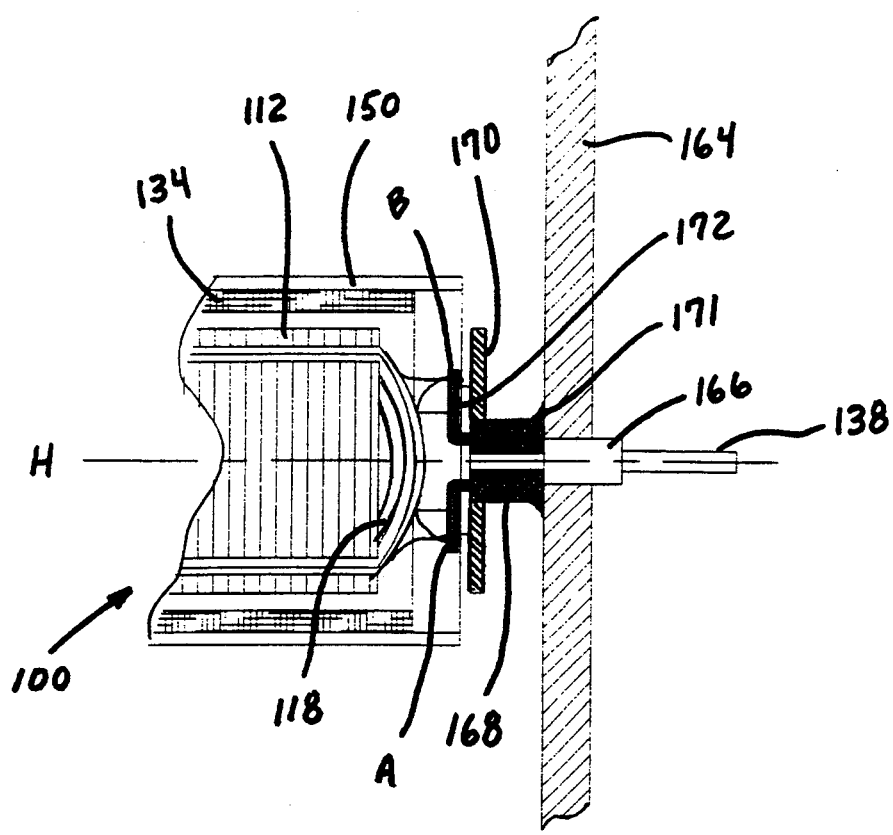
FIG. 7 is a partial cross-sectional view of a first bearing embodiment for use with the motor shown in FIG. 1.

Referring now to FIG. 7, there is shown a first preferred bearing embodiment for use with the motor 100. As illustrated, the motor 100 is mounted on a substrate 164, such as a circuit board. The substrate 164 includes a tube 166 which extends therethrough and receives the motor shaft 138. In the preferred embodiment, the tube 166 is constructed of stainless steel, and has an inner diameter approximately 0.001" larger than the diameter of the shaft 138 to provide a bearing surface. The inside surface of the tube 166 could be grooved to reduce the surface area contacting the shaft 138, thereby reducing the friction. A motor commutator 168 is fixedly attached to the substrate 164 by solder 171 or the like and includes three segments, two of which are illustrated. The commutator 168 also includes a plurality of coil terminators 172, each in electrical communication with an associated commutator segment. The coil terminators 172 are in electrical communication with the coil nodes A, B and C, only two of which are illustrated in FIG. 7. In the preferred embodiment, a brake disc 170 is supported by the commutator. The brake disc 170 is constructed of a low carbon steel, is 0.030" thick and has a 0.35" outer diameter. Preferably, the brake disc 170 and the stator (i.e. the stator lamination stack) are separated by a non-magnetic gap of 0.075". The brake disc 170 causes the magnet 134 to be displaced from its magnetic balance position by 0.020" with respect to the stator 112. By applying power to at least one of the coils 118, the stator 112 and magnet 134 are caused to re-align, freeing the magnet 134 from the brake surface for rotation.

Figure 8:
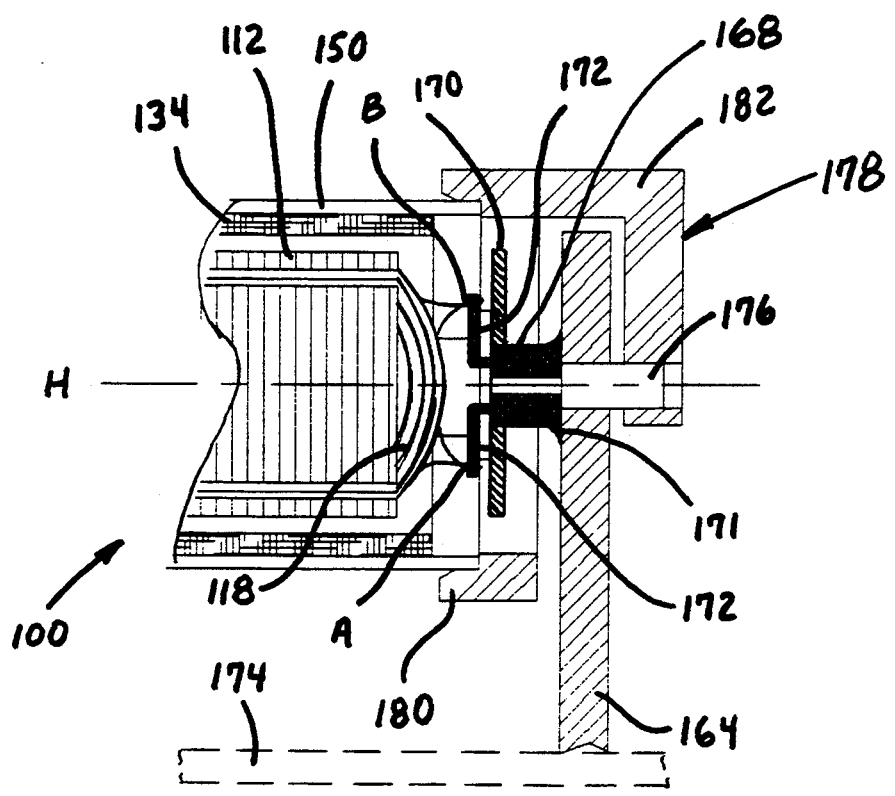
FIG. 8 is a partial cross-sectional view of a second bearing embodiment for use with the motor shown in FIG. 1.

Referring now to FIG. 8, there is shown an alternative bearing embodiment for the motor 100. As shown in FIG. 8, the motor 100 is mounted on a substrate 164, such as a circuit board. Alternatively, the substrate 164 could be a flex-strip, including electrical conductors, which is electrically connected to a circuit board 174, assuming proper support (not specifically illustrated) is provided for the motor 100. A stator shaft 176 provides support for rotation of the magnet 134 and the cap 150 about the stator 112. The motor commutator 168 is preferably fixedly attached to the substrate 164 by solder 171 or the like and includes three segments, two of which are illustrated. The commutator 168 also includes a plurality of coil terminators 172, each in electrical communication with an associated commutator segment. The coil terminators 172 are in electrical communication with the coil nodes A, B and C, two of which are illustrated. As illustrated, a rotor support 178 includes a ring portion 180 which is preferably affixed to the cap 150 to provide proper alignment. The ring portion 180 includes a central aperture through which the commutator 68 extends. The rotor support 178 also preferably includes an arm portion 182, which is formed on the ring portion 180. Thus, the rotor support 178 (i.e. the ring portion 180 and the arm portion 182) rotates about the motor axis "H". Although this construction provides a good bearing embodiment, the presence of the substrate 164 restricts the rotation of the magnet 134 due to the arm portion 182.

Figure 9:
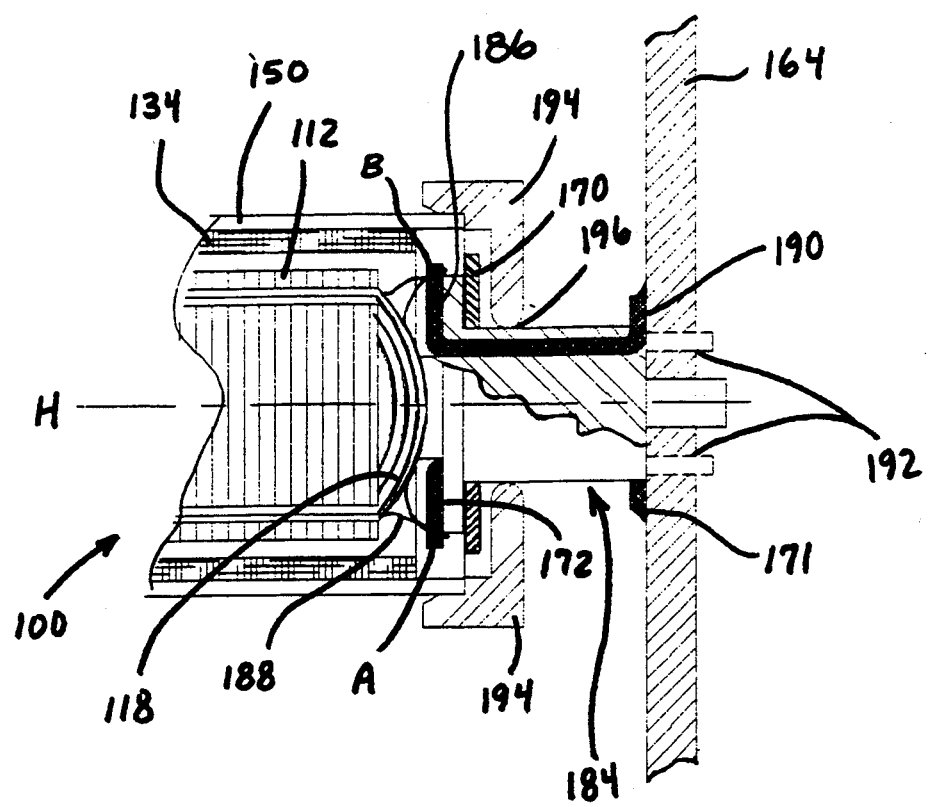
FIG. 9 is a partial cross-sectional view of a third bearing embodiment for use with the motor shown in FIG. 1.

Turning now to FIG. 9, there is shown another alternative bearing embodiment for the motor 100. As illustrated, the motor 100 is preferably mounted on a substrate 164, such as a circuit board. In this embodiment, a connector bearing assembly shown generally by reference numeral 184 replaces the commutator 168 of the previous two bearing embodiments shown in FIGS. 7 and 8. The connector bearing 184 includes a plurality of coil terminators 186 which extend through the connector bearing 184 from a point inside the motor 100 to the substrate 164. The coil terminators 186 are electrically connected to coil termination wires 188 which are thus in electrical communication with the substrate 164. The coil terminators 186 cooperate with the substrate 164 so as to form either a surface mounting connection shown generally by reference numeral 190 or a through-hole connection shown in phantom generally by reference numeral 192. A bearing cap 194 is affixed to the magnet 134 and the cap 150. In the preferred embodiment, the bearing cap 194 is constructed of Delrin and includes a central aperture through which the connector bearing 184 extends. The bearing cap aperture is sized such that the connector bearing 184 contacts the bearing cap, creating a bearing surface 196.

Figure 10:
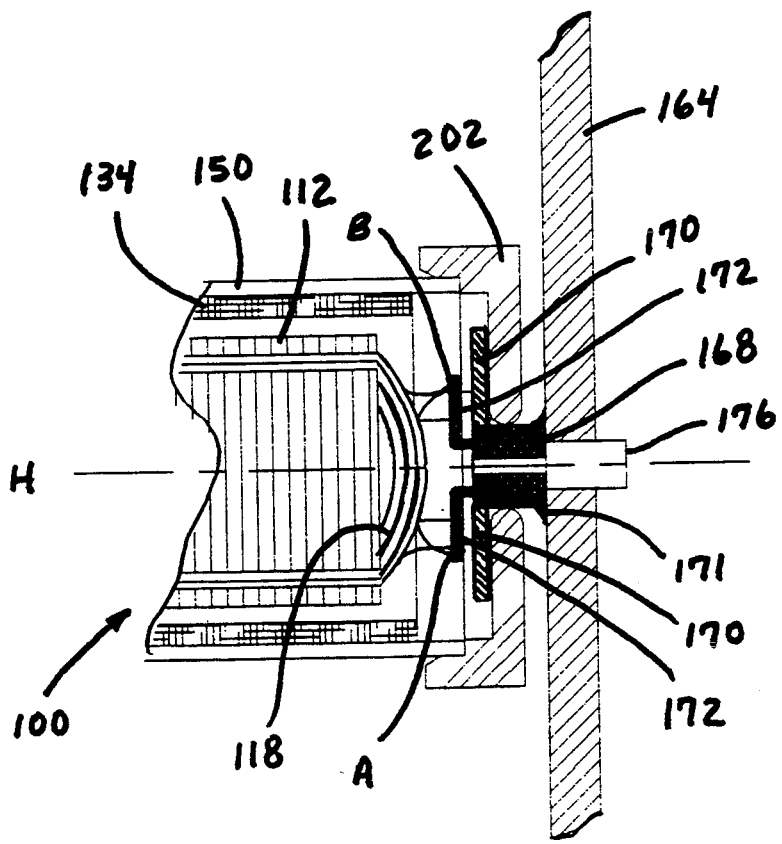
FIG. 10 is a partial cross-sectional view of a fourth bearing embodiment for use with the motor shown in FIG. 1.

Referring now to FIG. 10, there is shown yet another alternative bearing embodiment for the motor 100. In this preferred embodiment, the commutator 168 provides the bearing surface and the means through which the coils are electrically connected to the substrate 164, such as a circuit board. As in the embodiment shown in FIG. 7, the commutator 168 is fixedly attached to the substrate 164 by solder 171 or the like and includes three segments, two of which are illustrated. The commutator 168 also includes three coil terminators 172, each in electrical communication with an associated commutator segment. The coil terminators 72 are in electrical communication with the coil nodes A, B and C, only two of which are illustrated in FIG. 10. The stator shaft 176 extends through the commutator 168 and the substrate 164. A generally circular shaped bearing cap 202 is affixed to the magnet 134 and the cap 150 for rotation therewith. The bearing cap 202 is preferably constructed of Delrin and includes a central aperture disposed therein through which the commutator 168 extends.

Referring once again to FIG. 1, the piezoelectric brake 146 is generally concave in shape in its "unpowered" state. Thus, the piezoelectric brake 146 is normally biased against the plastic ring 136, i.e. the brake is normally "set" thereby preventing rotation of the output shaft 138 and any load attached thereto, (e.g. a pointer) after the load is in a desired position. When the brake 146 is energized, however, it deflects generally flat and away from the plastic ring 136, releasing the brake 146 and freeing the output shaft 138 to rotate to a new desired angular position.

Alternatively, braking of the motor 100 can be achieved without the use of the piezoelectric brake 146. Since the stator 112, as shown in FIG. 1, has more magnetic mass on "top" than on "bottom" it therefore has a magnetic center located above its physical center. As described in greater detail above, the magnet 134 centers itself around the magnetic center.

Figure 11:
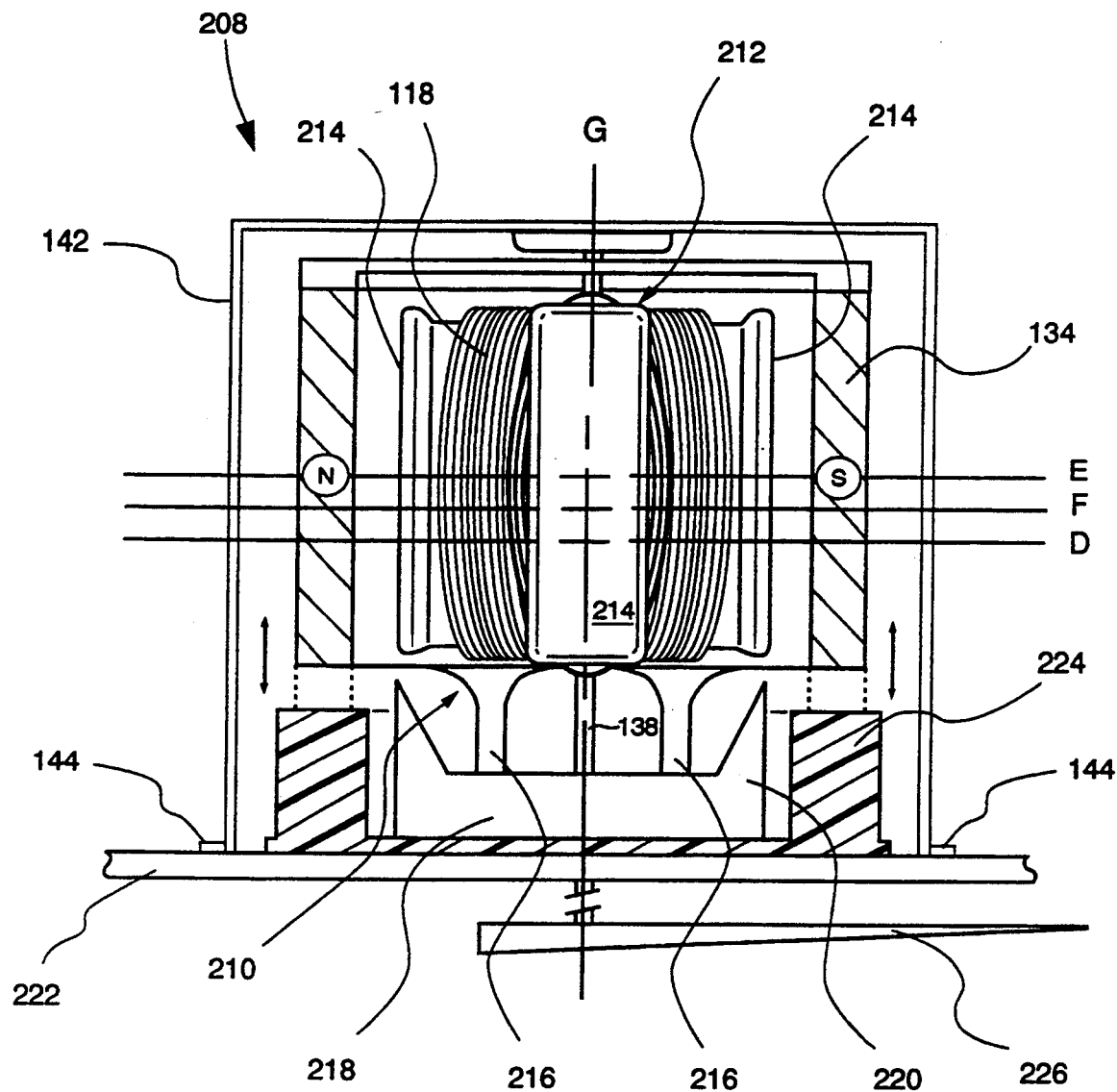
FIG. 11 is a view, partially broken away and in cross section, of an alternative embodiment of the motor of the present invention.

Referring now to FIG. 11, an alternative motor embodiment is shown generally by reference numeral 208, including an alternative stator assembly generally indicated by reference numeral 210. The stator assembly 210 includes an integrally formed ferromagnetic stator 212 having a central portion with an aperture (not specifically illustrated) extending completely therethrough and three generally T-shaped equally-spaced, lobes or poles 214. Each lobe 214 of the stator 212 has an integrally-formed, downwardly projecting magnetic leg 216 which passes through or around a generally annular magnetically permeable base 218. The magnetically permeable base 218 has an axially projecting lip portion 220 which cooperates with the rest of the magnetic circuit to provide an essentially closed-loop flux path. The magnetically permeable base 218 is preferably positioned centrically within and fixedly attached to a substrate, such as a circuit board 222. The legs 216 of the stator assembly 210 permit surface mounting to the circuit board 222. This design results in the combined magnetic permeability center of the assembly 210 and the base 218 to be located at a position, labeled as "D" being below its electromagnetic center, labelled as "E" in FIG. 11.

With continued reference to FIG. 11, when the coils 118 are not powered, the magnetic permeability center "D" of the stator 212 and magnetically permeable base 218 causes the center of magnetism in the magnet 134 to seek the level "D" Before the magnet 134 reaches level "D" the magnet 134 contacts brake element 224 and stops at level "F". The surface of brake element 224 can be textured or the material can be selected to achieve coefficient(s) of friction as desired. If the magnetic base 218 were not present, the magnet's center of magnetism would be attracted only to the stator 131 and the magnet would tend to seek level "E".

With the magnetic base 218 in place as shown in FIG. 11, the magnet 134 will move "down" from level "E" toward level "D" and will stop at level "F" due to the magnet 134 contacting the brake element 224. The magnet 134 is held in place and prevented from rotating about motor axis "G", thereby holding pointer 226 in place, which is affixed to magnet 134 by the shaft 138.

When a new pointer position is desired, the control means applies a drive voltage to one or more of the coils 118, causing an electromagnetic field to be set up at level "E". This magnetic field at level "E" is generally attracting the center of magnetism of magnet 134 toward that level. At the same time, the center of magnetism of magnet 134 is attracted to level "D" due to the permeability of magnetic base 218. By having appropriate drive voltage applied to one or more coils 118 the "up" force on the magnet 134 toward level "E" is greater than the "down" force toward level "D". As a result, the magnet 134 moves away from level "F" toward level "E" thereby releasing magnet 134 from the brake element 224.

Thus, the drive voltage(s) applied to the coil(s) 118 should be capable of rotating the pointer 226 to the new angular position about axis "G" and also be capable of releasing the magnet 134 from the brake 224. After appropriate time to allow pointer 226 to achieve its new angular position, power is removed from coils 118, allowing the magnet 134 to be pulled down to level "F" and be held by brake 224 until it is desired to move the pointer 226 to a new position.

Figure 12:
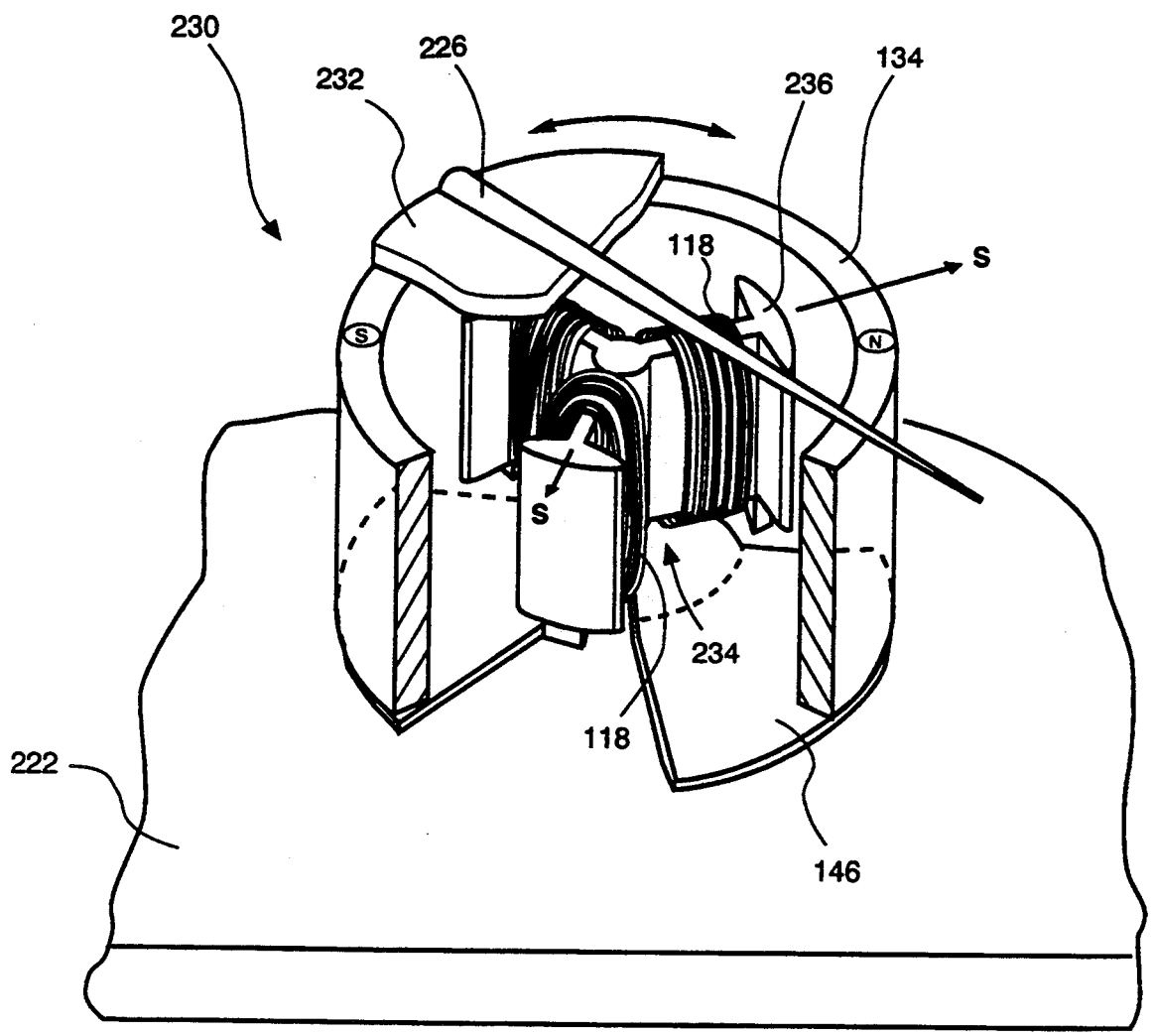
FIG. 12 is a view, partially broken away and in cross section, of still another embodiment of the motor of the present invention, adapted to be mounted on the front surface of a substrate;.

Referring now to FIG. 12, an alternative motor embodiment is generally indicated by reference numeral 230. The motor 230 is a front mount design, capable of being surface-mounted to the front of the substrate, such as a circuit board 222 or the VFD 102 shown in FIG. 1. In this embodiment, the pointer 226 is fixedly attached to a lid 232, instead of being affixed to the motor output shaft. Preferably, the lid 232 is constructed of plastic and is fixedly attached to the magnet 134 for rotation therewith relative to the stator assembly, shown generally by reference numeral 234. The stator assembly 234 includes a stator 236, which is substantially similar to the stator 212 previously described. The stator 236, however, is without an aperture extending through its central portion.

With continuing reference to FIG. 12, when the piezoelectric brake 146 and the coils 118 are energized, the lower surface of the magnet 134 is disengaged from the brake 146. The magnet 134 rotates relative to the stator 236, as shown by the arrows, until the poles of the starer and the magnet 134 are aligned to provide a stable position. The pointer 226 is thus displaced to a new angular position, at which time the coils 118 and the brake 146 may be deenergized. The brake 146 then returns to its concave shape, braking and holding the magnet 134 (and the pointer) in place.

Figure 13:
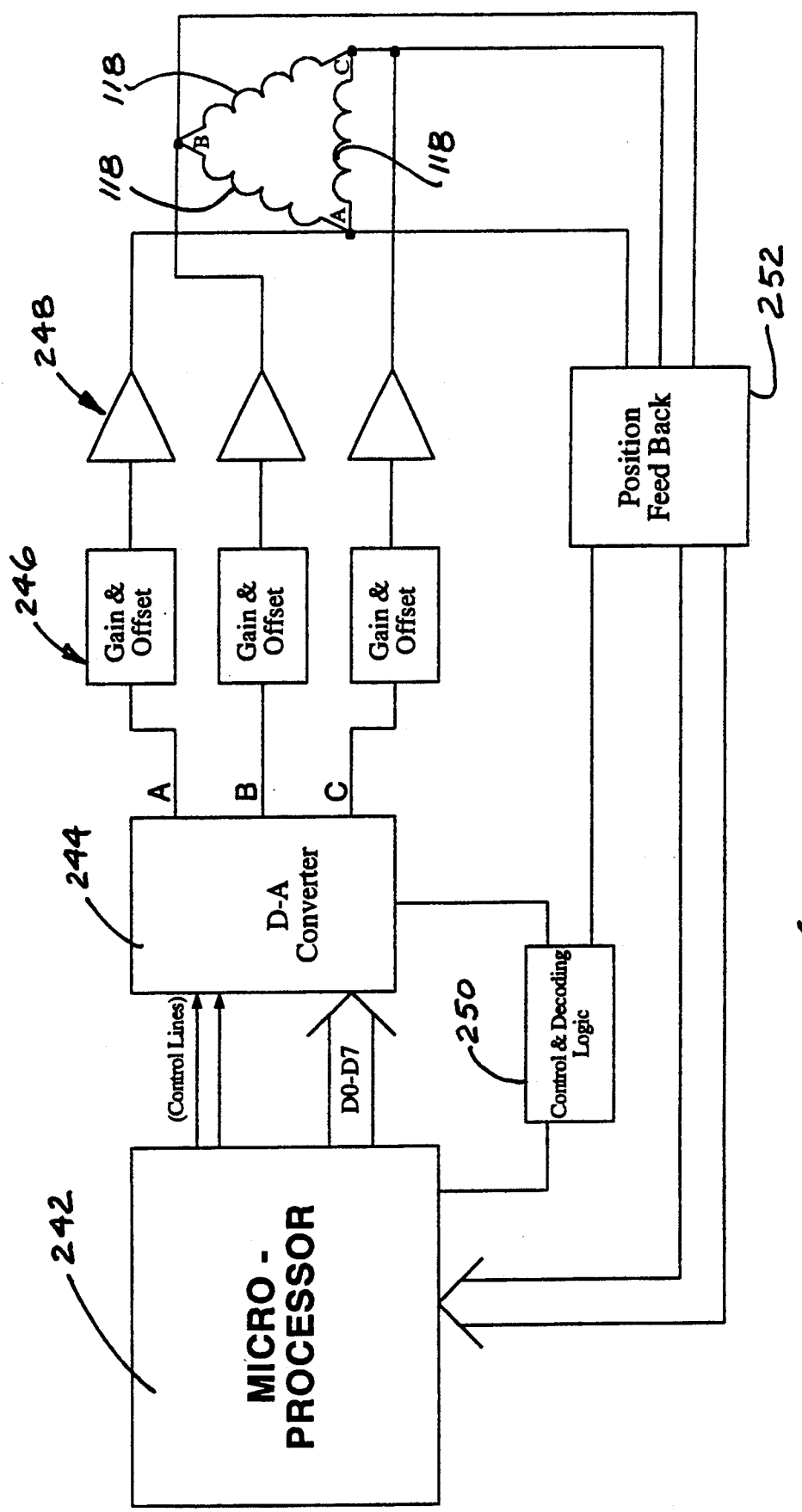
FIG. 13 is a schematic block diagram of a first coil drive system shown for use with a motor constructed in accordance with the present invention.

Referring now to FIG. 13, there is illustrated a block diagram for a first coil drive system shown generally by reference numeral 240. The coil drive system 240 preferably includes a microprocessor 242, a digital-to-analog (D/A) converter 244, gain and offset circuitry 246 and a power amplifier stage shown generally by reference numeral 248. The microprocessor 242, such as a 68HC05 series microprocessor, commercially available from Motorola, of Phoenix, Ariz., United States of America, reads and processes inputs from sensors not specifically illustrated to generate a desired angular position for the motor. Preferably, data corresponding to the coil drive voltages (shown in FIG. 4) are stored in look-up table in memory not specifically illustrated. This desired position is communicated as a digital signal to the D/A 244, such as 86021, an 8-bit, 4-channel D/A commercially available from the Microelectronics IC Divisions of Fujitsu, of San Jose, Calif., United States of America, which converts the digital signal to a corresponding analog signal. Accurate communication between the microprocessor 242 and the D/A 244 is assured by standard control and decoding logic 250, which functions to select a D/A channel, and the like. Depending on which coils need to be energized to rotate the motor to the desired position, the analog position signal is next communicated to the appropriate gain and offset circuitry 246 and the power amplifier stage 248. The power amplifiers 248 function to amplify the sinusoidal coil drive voltage signals, which can be at rather low levels, preferably to values of between approximately 3V to approximately 7V. Position sensor circuitry 252 monitors the coil voltages and provides position feedback signals related to the angular position of the motor shaft to the microprocessor 242. Thus, it should be appreciated that the microprocessor based system 240 is fully programmable, providing for control of actual gauge movement through coil energization as well as providing for control of "when" the coils are energized.

Figure 14:
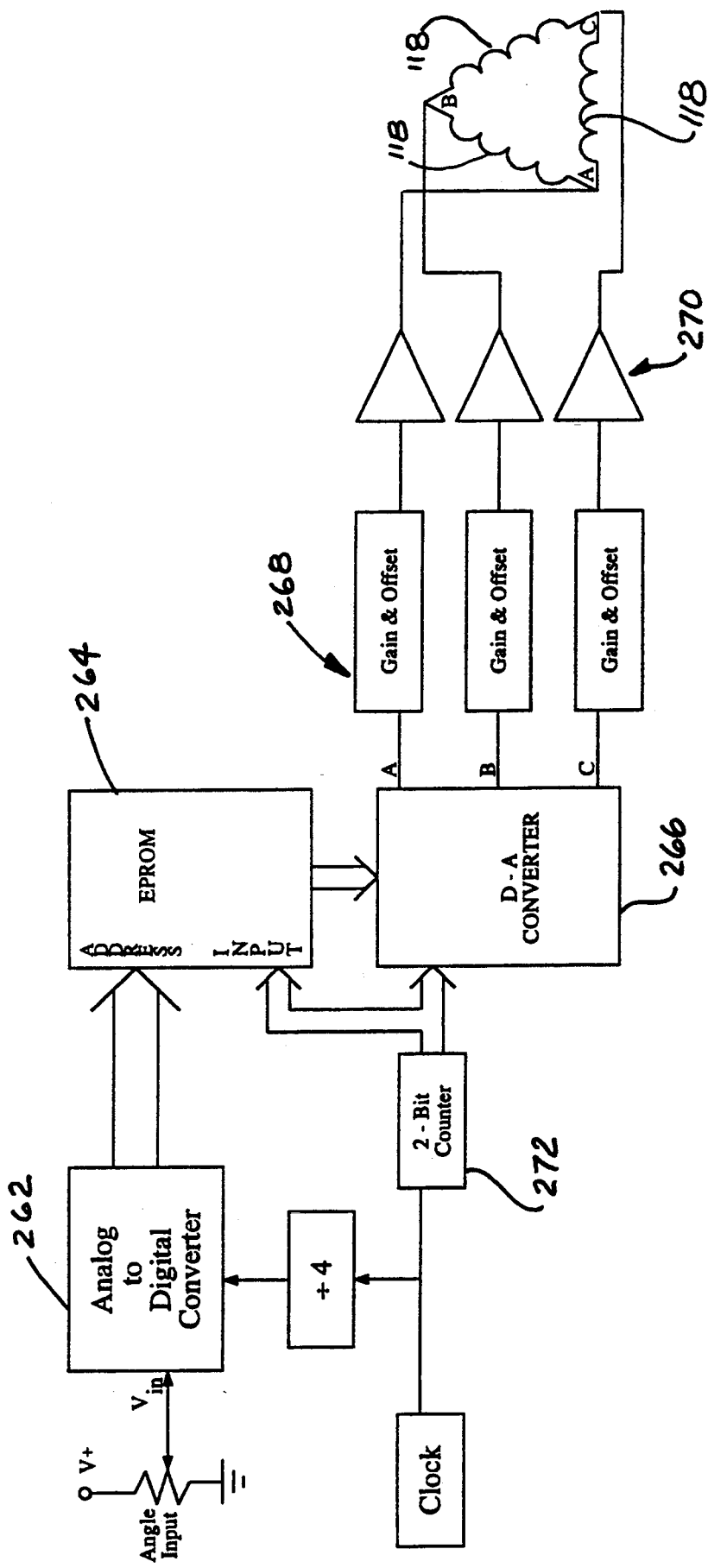
FIG. 14 is a schematic block diagram of a second coil drive system shown for use with a motor constructed in accordance with the present invention.

Turning now to FIG. 14, there is illustrated a block diagram for an alternative programmable coil drive system, shown generally by reference numeral 260. As illustrated, the coil drive system 260 includes an analog-to-digital (A/D) converter 262, an electrically programmable read-only memory (EPROM) 264, a D/A 266, gain and offset circuitry shown generally by 268 and a power amplifier stage shown generally by 270. An analog voltage signal ($V_{in}$), such as from a fuel level sensor, is provided to the A/D 262, such as ADC0808, commercially available from National Semiconductor, of Santa Clara, Calif., United States of America. The A/D 262, as is known, converts this analog signal, approximately every four (4) clock ticks, to a corresponding digital signal and communicates the digital signal to the EPROM 264. The digital signal actually represents a base address in the EPROM, which address contains digital data representing coil drive voltage for a node (e.g. node A). The coil drive voltages for nodes B and C are preferably located in the next two address locations, which are accessed after appropriate signal from the 2-bit counter are communicated to the EPROM. Thus, the EPROM 264 provides the data required to generate the sinusoidal drive voltages (such as those shown in FIG. 4) to rotate the motor to the desired angular position. Of course, the EPROM 264 could have data representing any other waveform, such as a square or triangle waveform. The digital data is communicated by the EPROM 264 to the D/A 266. The 2-bit counter 272 provides channel select data to the D/A 266. Further processing of the coil drive voltages by the gain and offset circuitry 268 and the power amplifiers 270 is substantially the same as described above with reference to FIG. 13. Thus, the programmable drive system 260 is a continuous system, in that $V_{in}$ is read and the motor is driven.

Figure 15:
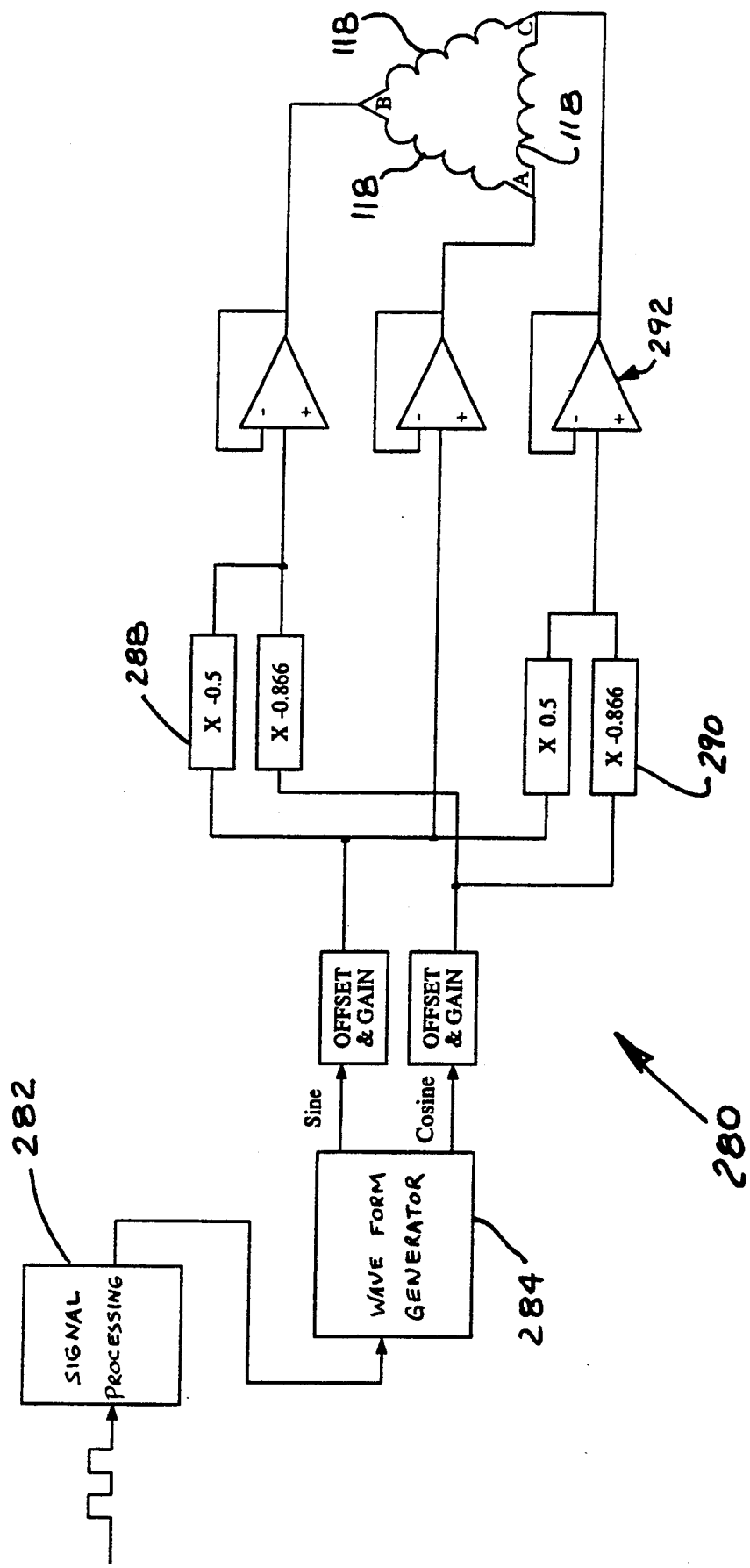
FIG. 15 is a schematic block diagram of a third coil drive system shown for use with a motor constructed in accordance with the present invention.
Figure 16:
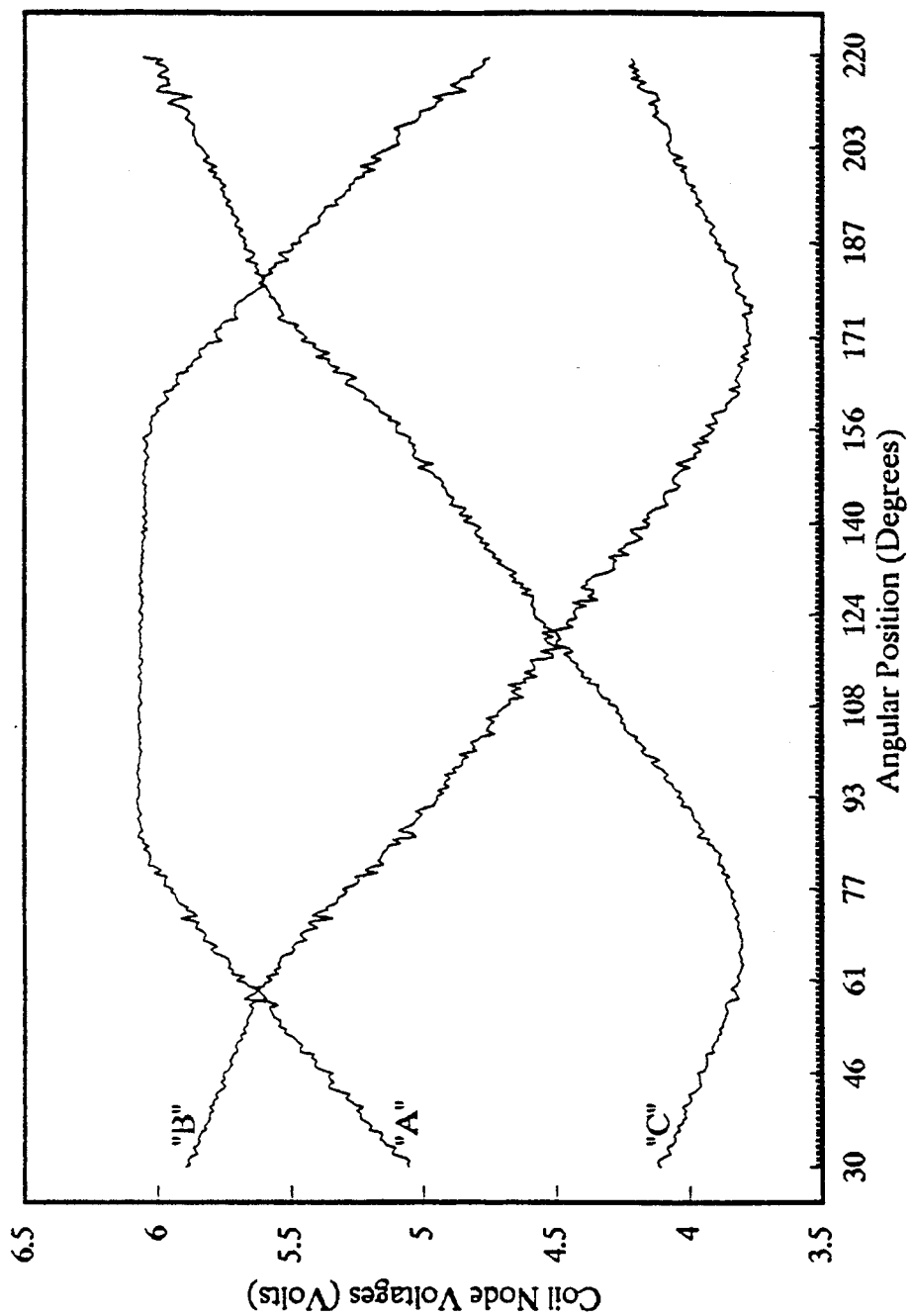
FIG. 16 is a graphical illustration of coil node voltages for use with the coil drive system shown in FIG. 15.

Referring now to FIG. 15, there is illustrated a block diagram for an alternative piece-wise linear 3-coil motor drive system, shown generally by reference numeral 280. The embodiment is shown for use with a motor utilized in a engine speed gauge of a vehicular instrument cluster. In this embodiment, an input signal, such as from an engine speed sensor (not specifically illustrated), is provided to the signal processing circuitry shown generally by reference numeral 282, which processes by introducing a gain which varies according to the number of cylinders in the engine of the vehicle. This signal is generally indicative of the desired angular position of the pointer associated with the gauge (e.g. the gauge pointer should be located at 65 mph). This signal is then communicated to a waveform generator 284, such as an LM1819, commercially available from National Semiconductor, of Santa Clara, Calif., United States of America. The waveform generator functions as a converter from frequency to voltage, preferably generating sine and cosine waveforms. These sine and cosine waveforms are then processed by standard offset and gain circuitry, shown generally by reference numeral 286. Next, a "copy" of the sine waveform is communicated directly to the power amplifiers 292. A "copy" of the both the sine and cosine waveforms is processed by phase shifting circuitry shown generally by reference numeral 288 and combined prior to being communicated to an amplifier 292. Preferably, the phase shifting circuitry 288 multiplies the sine waveform by a first constant (i.e. −0.5) and multiplies the cosine waveform by a second constant (i.e. −0.866). Thus, the circuitry 288 functions to generate a phase shifted sine waveform (e.g. X +120°). The other "copy" of the waveform is processed by the phase shifting circuitry shown generally by reference numeral 290, which functions similarly to generate a second phase shifted sine waveform. (e.g. X+240°). Thus, three 120° phase shifted waveforms are communicated to the power amplifiers 292, which amplify the waveforms for application to the coil nodes A, B and C formed by the electrical interconnection of the coils 118. FIG. 16 illustrates sample coil drive voltage waveforms, plotted versus angular position, generated by the coil drive system shown in FIG. 15. As shown on the horizontal axis, only approximately 190° of the waveforms generated by the waveform generator 284 are graphed. However, the circuit has the capability to produce a full 360° of rotation. Since the waveform generator 284 only generates approximations of sine and cosine waves, some inaccuracies, such as the plateau on the voltage waveform for node "A" are to be expected. Such inaccuracies do not, however, significantly affect positioning accuracy.

Figure 17:
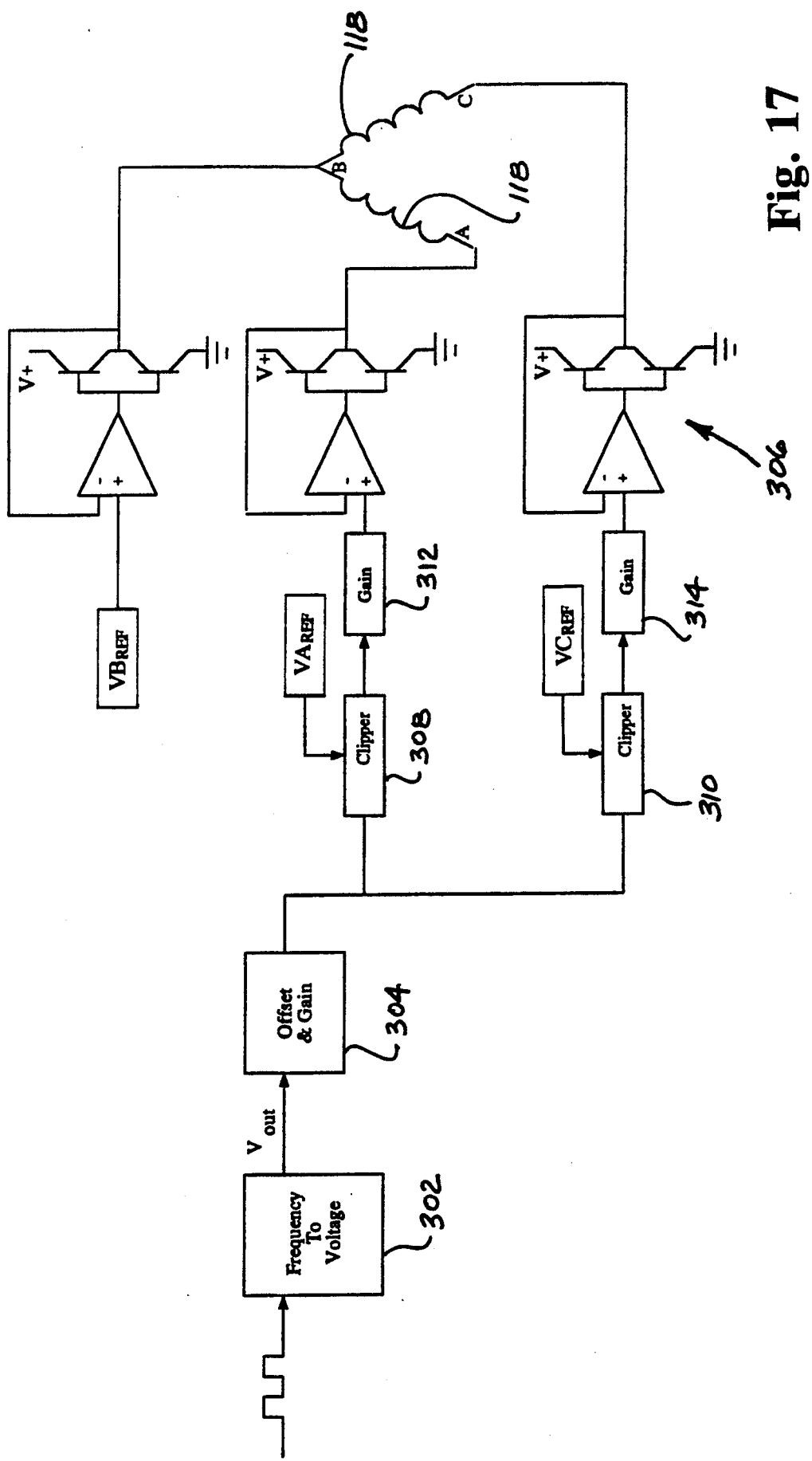
FIG. 17 is a schematic block diagram of an alternative 2-coil drive system for use with a motor constructed in accordance with the present invention.
Figure 18:
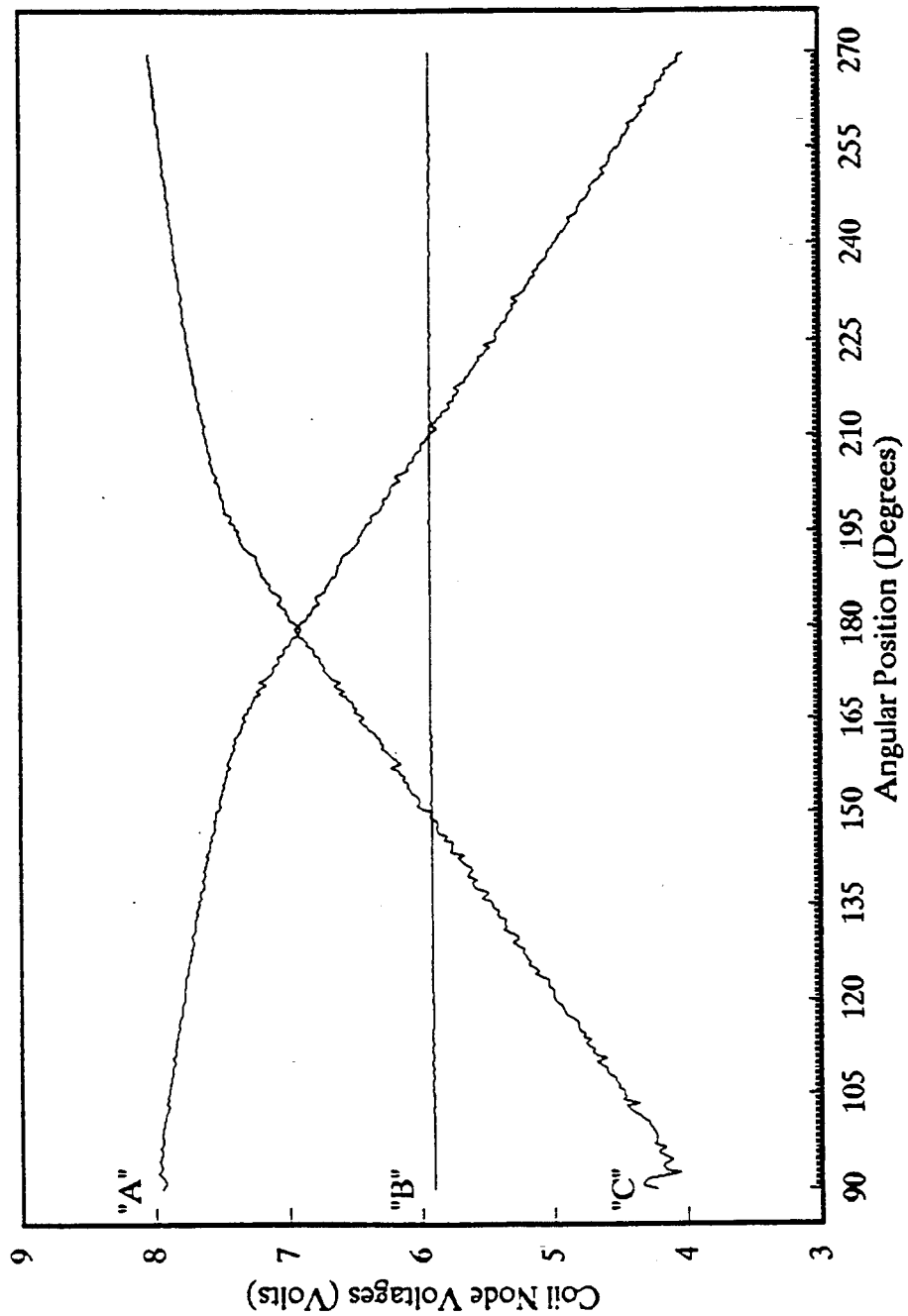
FIG. 18 is a graphical illustration of coil node voltages for use with the coil drive system shown in FIG. 17.

Referring now to FIG. 17, there is shown a block diagram for an alternative piece-wise linear 2-coil motor drive system, shown generally by reference numeral 300. As illustrated, the 2-coil drive system 300 includes a frequency-to-voltage converter 302, offset and gain circuitry shown generally by 304 and a transistor power stage shown generally by 306 including a plurality operational amplifiers and transistors. In this embodiment, an input signal, such as from an engine speed sensor (not specifically illustrated), is provided to the frequency-to-voltage converter circuitry 302, such as an LM2917, commercially available from National Semiconductor, of Santa Clara, Calif., United States of America which outputs an analog voltage signal. The analog voltage signal is then processed by standard offset and gain circuitry 304, which outputs a generally linear ramp to the clipper circuits 308 and 310 of the transistor power stage. Clipper circuit 308 is also provided with a reference voltage ($VA_{ref}$), which represents the voltage level the clipper circuit 308 clips the linear ramp. The output of the clipper circuit 308 is communicated to negative gain circuitry 312, which functions to invert the clipped linear ramp. The output of the gain circuitry 312 is then communicated to the associated operational amplifier/transistor for application to the coil node "A". The drive voltage for node "C" is generated with substantially similar circuitry, except that positive gain circuitry 314 utilized (i.e. the clipped ramp is not inverted). Typical coil drive voltages for nodes "A" and "C" are illustrated in FIG. 18. Since there are only two coils, node "B" is maintained at a positive bias voltage level, as illustrated in FIG. 18.

As the drive voltages for nodes "A" and "C" swing, node "B" operates to both source and sink current. For example, with reference to FIG. 18, at an angular position of approximately 120° it can be seen that coil node voltage "A" >coil node voltage "B" >coil node voltage "C". Thus, node "B" acts as a current sink for the current flowing from "A", and a current source for current flowing to node "C". However, at an angular position of approximately 225° coil node voltage "C" >coil node voltage "B" >coil node voltage "A". Thus, node "B" acts as a current sink for the current flowing from node "C" and a current source for current flowing to node "A".

Figure 19:
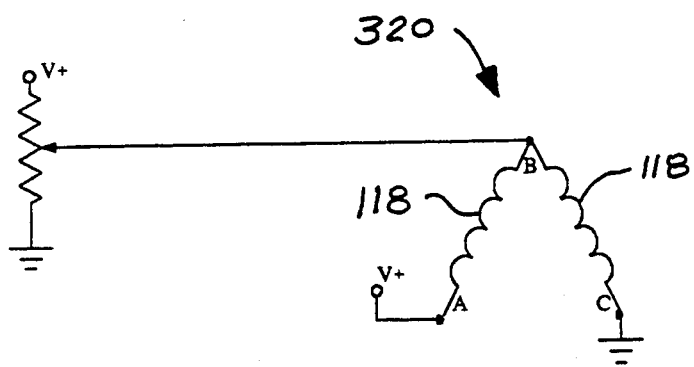
FIG. 19 is a schematic diagram for a basic passive coil drive system for use with a motor constructed in accordance with the present invention.
Figure 20:
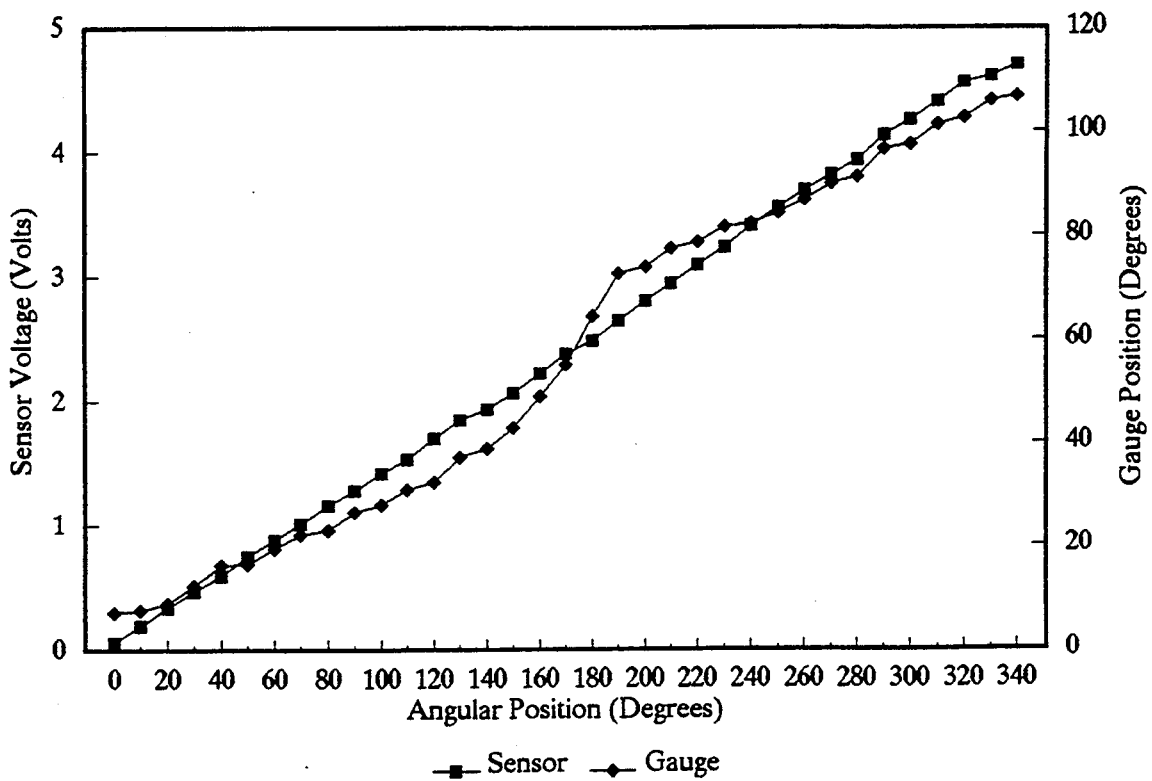
FIG. 20 is a graphical representation of the relationship between sensor voltage and corresponding gauge position (°) for the drive system shown in FIG. 19.

Referring now to FIG. 19, there is illustrated a schematic diagram for a basic passive coil drive system, shown generally by reference numeral 320. In this embodiment, an analog voltage signal is generated, such as by a fuel level sensor. As illustrated, this analog voltage signal is then communicated to coil node "B" to set up a reference voltage level at node "B". Preferably, coil node "A" is electrically connected to a voltage source (V+) and coil node "C" is electrically connected to a ground potential. Thus, current (i) flows in the direction indicated by the arrows. It should be appreciated that such a drive system is inexpensive and provides for approximately 120° of rotation. FIG. 20 is a graphical representation of the relationship between sensor voltage (i.e. voltage at node "B") and corresponding gauge position (o). As shown, there is generally a linear relationship between sensor voltage and gauge position.

Figure 21:
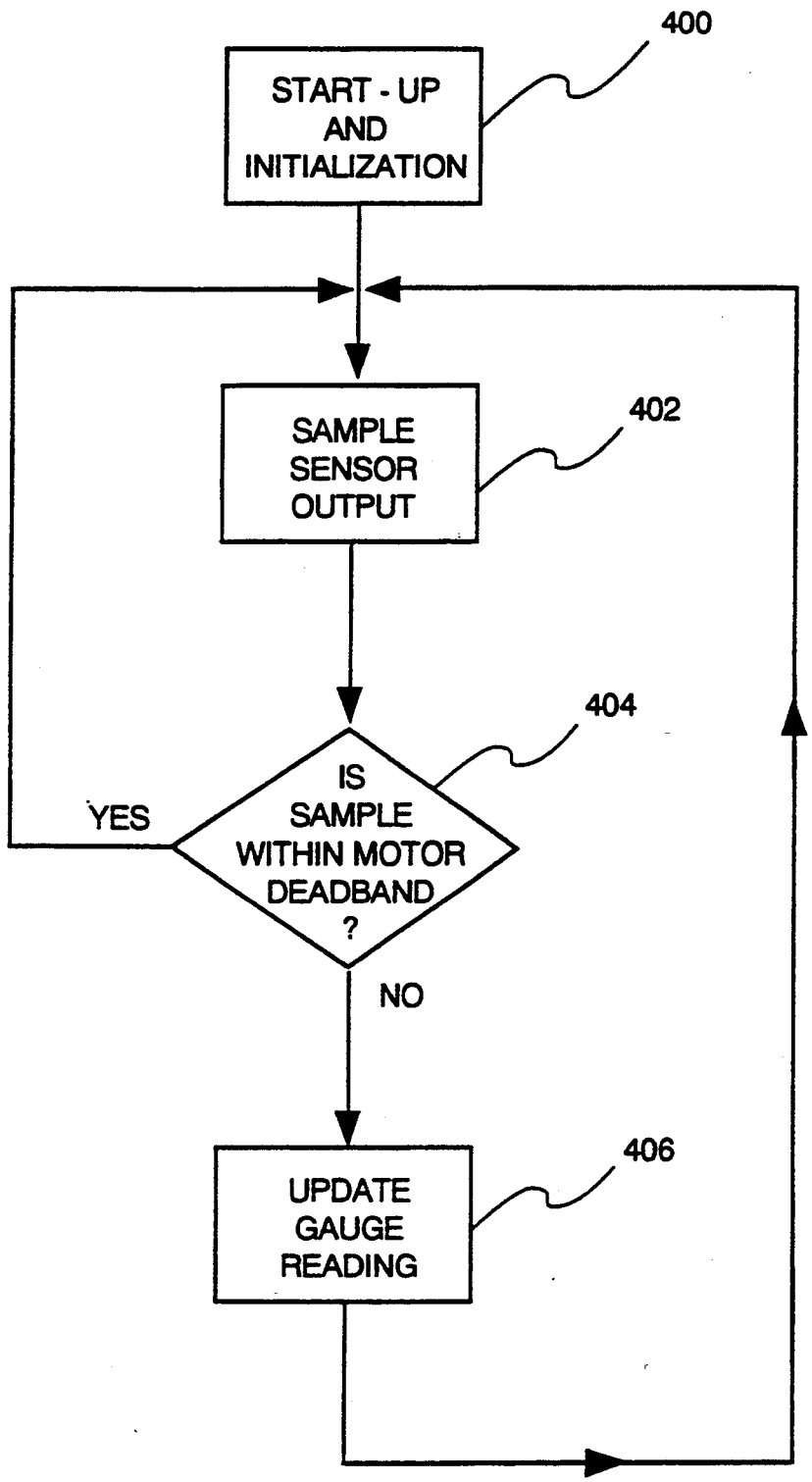
FIG. 21 is a flow chart illustrating the main control logic flow for use with the present invention.

Referring now to FIG. 21, a flow chart illustrates the program flow for use with the microprocessor-based drive system 240 shown in FIG. 13. At step 400, the microprocessor ($\mu$P) 242 enters a start-up and initialization phase, which includes resetting variables, checking memory, and the like. At step 402, the $\mu$P 242 reads sensor output, and program flow is transferred to the "Sample Sensor Output" subroutine shown in FIG. 22.

Figure 22:
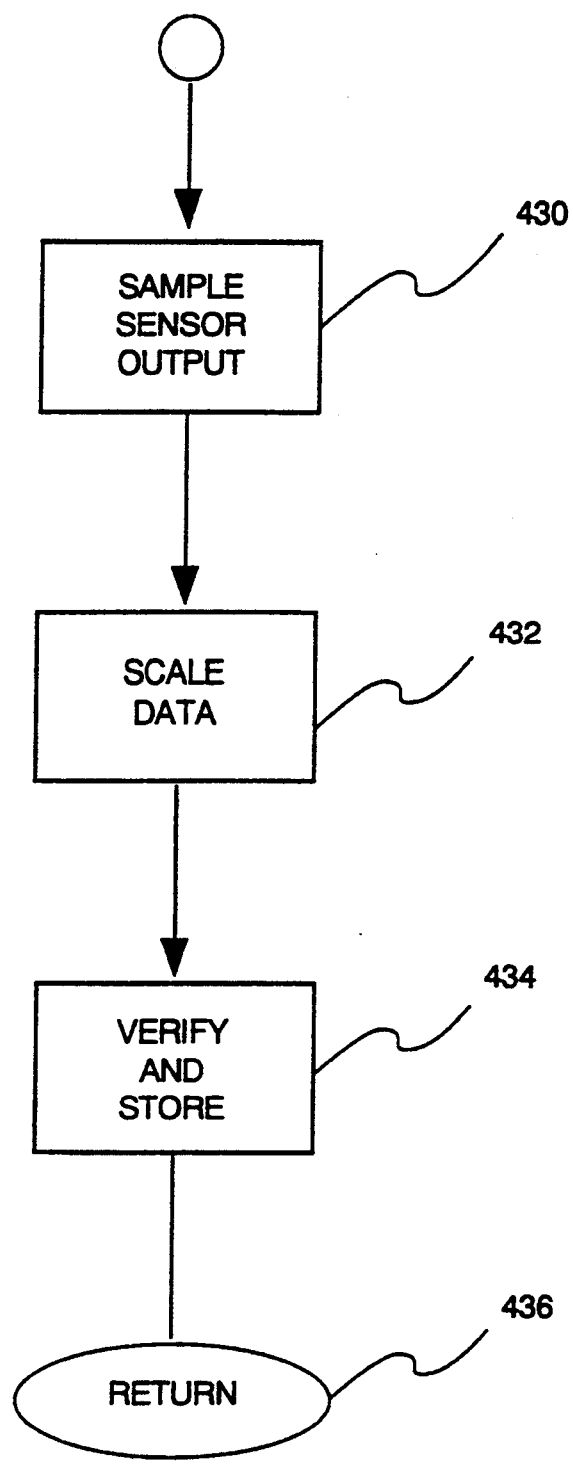
FIG. 22 is a flow chart illustrating the logic flow of a subroutine of the main control shown in FIG. 21.

As shown in FIG. 22, at step 430 the $\mu$P 242 acquires output from sensors, such as an engine speed sensor. If the sensor output is analog, an internal A/D converts the output into digital format for further processing. Due to the differences in the type of sensors that could be providing data to the $\mu$P 242, sensor output can vary drastically in magnitude. For the most accurate processing, therefore, the digitized sensor output is scaled at step 432.

The scaled data is then verified and stored in an internal volatile memory element or random-access memory (RAM) of the $\mu$P 242 at step 434. Data verification insures detection of sensor deterioration and/or failure. At step 436, program flow is returned to the main program shown in FIG. 21.

Figure 23:
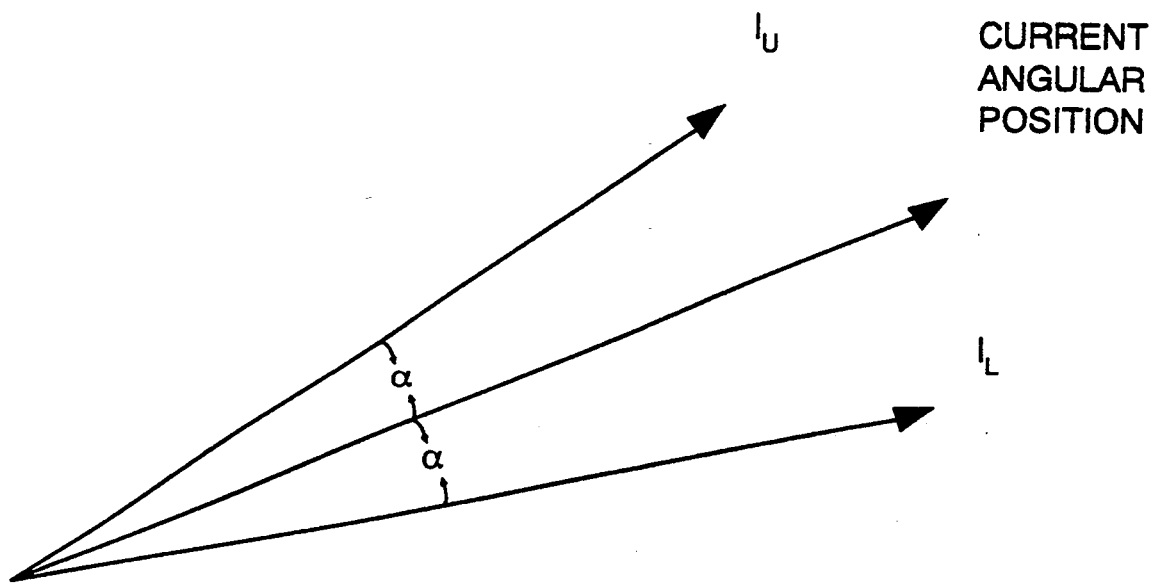
FIG. 23 is a graphical illustration of the deadband of the motor.

As shown in FIG. 21, at step 404 the $\mu$P 242 determines if the scaled sensor output is within a deadband of the motor 100. The deadband represents the required minimum change in angular position of the motor 100 and is illustrated graphically in FIG. 23. Preferably, the new angular position of the motor 100 is outside of the upper limit $l_u$ or the lower limit $l_l$ (i.e. move through an angle of $\alpha$°) before the $\mu$P 242 will energize the coils 118 and update its gauge position. The $\mu$P 242 first determines the numerical difference between the scaled sensor output and the scaled data value representing the current angular position of the motor 100. If this difference would translate to a change in angular position exceeding the deadband, the pointer position is updated.

Figure 24:
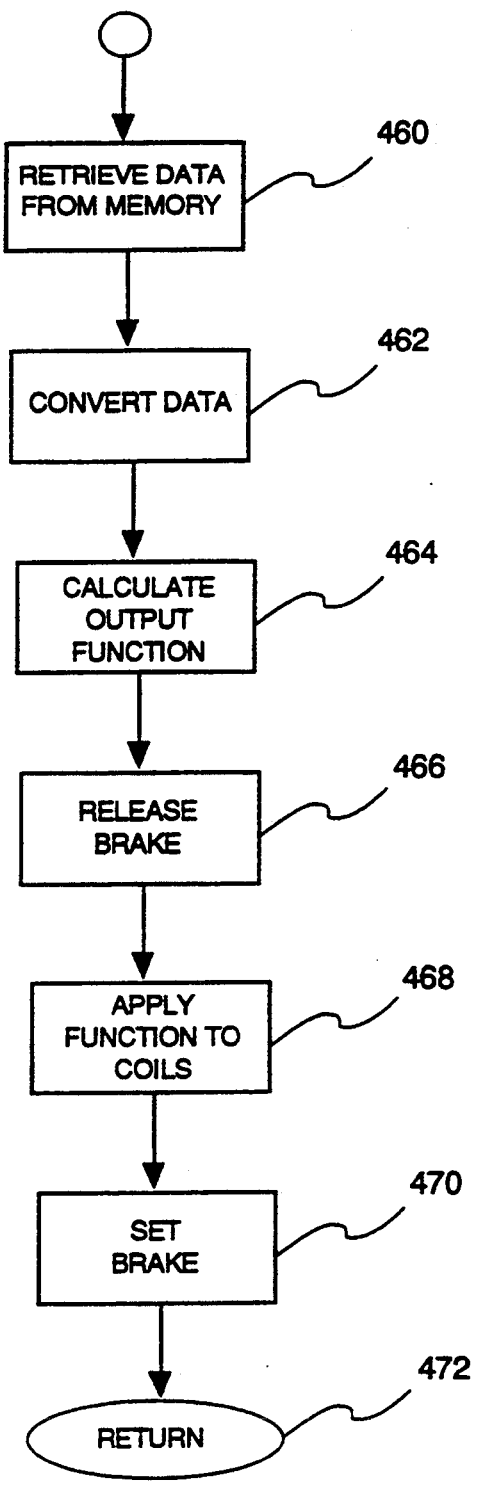
FIG. 24 is a flow chart illustrating the logic flow of another subroutine of the main control shown in FIG. 21.

At step 406, program flow is transferred to the "Update Gauge Reading" subroutine shown in FIG. 24. The scaled data is retrieved from the RAM memory at step 460. At step 462, the data is then converted to a value representative of a corresponding desired motor angular position. For example, the sensor reading may correspond to a new speed of which is converted to an angular position of X° as indicated on the graph The $\mu$P 242 then performs a data table look-up of data stored in a read-only memory (ROM), not specifically illustrated, utilizing the desired motor angular position data. The ROM preferably contains a table containing data representing drive voltages for the coils 118. Generally, every angular position of motor 100 can be characterized by a unique set of coil voltages, as previously shown in FIG. 4.

With continuing reference to FIG. 24, at step 464 the $\mu$P 242 utilizes the set of data voltages to calculate the output function to be applied to each of the coils 118. Prior to applying the output function (i.e. the drive voltages) to the coils 118, the $\mu$P 242 energizes the piezoelectric brake 146 (shown in FIG. 1) at step 466. As previously described, this deflects the brake flat, thereby releasing the rotor assembly 130, allowing the motor output shaft 138 to rotate.

Figure 25:
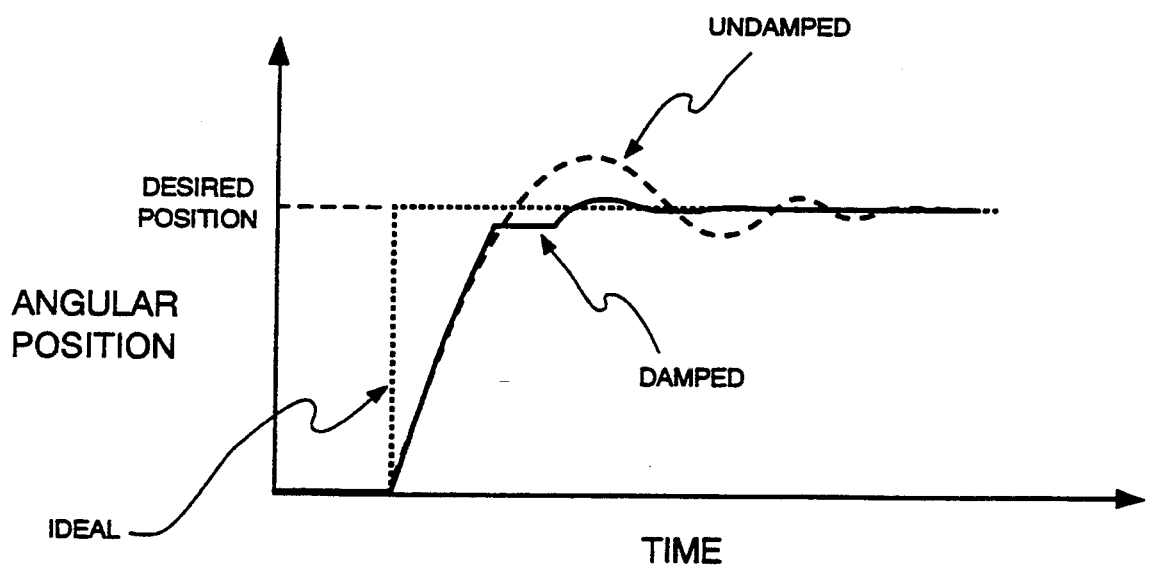
FIG. 25 is a graphical illustration of ideal, undamped and damped motor responses plotted versus time.

At step 468, the $\mu$P 242 energizes the coils 118 according to the output function. The output shaft 138 then rotates to the desired angular position. At step 470, the $\mu$P 242 removes power from the piezoelectric brake 146. The brake 146 thus returns to its concave shape and is set against the rotor assembly 130, thereby preventing further rotation. The use of the piezoelectric brake 146 may allow for the precise control of the response of the motor 100 to an output function. FIG. 25 illustrates the relationship between an ideal motor response (i.e. a step response), a damped motor response and an undamped motor response over time. Specifically, various levels of brake application during shaft rotation may minimize overshoot and fix the angular position quickly and accurately.

It is understood, of course, that while the forms of the invention herein shown and described constitute the preferred embodiments of the invention, they are not intended to illustrate all possible forms thereof.

For example, a position feedback signal related to the position of the load can be generated by energizing one of the coils 118, such as in the delta connection of FIG. 2A, and sensing any resulting current or voltage appearing across one or both of the other coils.

It will also be understood that the words used are words of description rather than limitation, and that various changes may be made without departing from the spirit and scope of the invention as disclosed.

What is claimed is:
1. An electric motor for rotating a load to a desired angular position in response to a sensor signal comprising:
a stator assembly including a stator having a plurality of lobes, the stator including at least one coil wound about at least one of the plurality of lobes, each coil having a pair of input leads;

a rotor assembly including a magnet having a plurality of poles, the magnet being magnetized according to a magnet flux profile having an amplitude which varies substantially sinusoidally with angular position, the magnet adapted to be coupled to the load and rotatably positioned relative to the stator assembly; and means for electrically connecting the leads of the at least one coil to form an input terminal, the rotor assembly rotating relative to the stator assembly in response to a substantially continuously variable electrical signal applied to the input terminal to angularly position the rotor assembly to any one of a plurality of positions independent of stator geometry, the angular position of the load varying generally linearly with the sensor signal.

2. The electric motor of claim 1 wherein the rotor assembly further comprises a shaft adapted to be coupled to the load, the shaft extending through said stator.

3. The electric motor of claim 1 wherein the stator has an odd number of lobes, the stator including at least one coil wound about at least one of the lobes and wherein the magnet has an even number of poles.

4. The electric motor of claim 1 further comprising:
control means for controlling movement of the load and for applying a substantially continuously variable electrical signal to the input terminal to rotate the rotor assembly relative to the stator assembly to any one of a plurality of angular positions, independent of stator geometry.

5. The electric motor of claim 1 wherein the stator includes a plurality of lobes, each having a coil wound thereabout.

6. The electric motor of claim 1 wherein the load is a needle pointer.

7. The method of claim 1 wherein the substantially sinusoidal magnetic flux profile has a peak flux of about 400 gauss.

8. The electric motor of claim 2 further comprising bearing means for rotatably supporting the shaft within the stator assembly while allowing the shaft to rotate freely with respect to the stator assembly.

9. The electric motor of claim 1 further comprising a layer of insulating material having electrical conductors formed thereon, the stator lobes being made of a magnetically permeable material and being angularly positioned with respect to each other, the at least one coil being electrically connected to respective conductors.

10. An electric motor for driving a load comprising:
a stator assembly including a stator having a plurality of lobes, the stator including at least one coil wound about at least one of the plurality of lobes, each coil having a pair of input leads;

a rotor assembly including a magnet having a plurality of poles, the magnet adapted to be coupled to the load and rotatably positioned relative to the stator assembly;

means for electrically connecting the leads of the at least one coil to form an input terminal, the rotor assembly rotating relative to the stator assembly in response to a substantially continuously variable electrical signal applied to the input terminal to angularly position the rotor assembly to any one of a plurality of positions independent of stator geometry;

a layer of insulating material having electrical conductors formed thereon, the stator lobes being made of a magnetically permeable material and being angularly positioned with respect to each other, the at least one coil being electrically connected to respective conductors, wherein the layer of insulating material has a back surface, the stator being fixedly secured to the back surface of the layer and wherein the magnet is biased against the back surface of said layer, thereby supplying a braking force to the rotor assembly, the coils being responsive to the flow of electrical energy to cause the magnet to move away from the back surface of the layer, thereby permitting the rotor assembly to rotate.

11. The electric motor of claim 1 wherein the stator assembly includes three coils, the coils being positioned 120° from each other.

12. The electric motor of claim 11 wherein the coils are connected in a delta connection.

13. The electric motor of claim 11 wherein the coils are connected in a star connection.

14. The electric motor of claim 11 wherein the coils are connected in a grounded star connection.

15. The electric motor of claim 4 wherein the control means is a closed loop control including means for generating a position feedback signal related to the position of the load.

16. The method of claim 11 wherein the substantially continuously variable electrical signals applied to the three coils are phase-shifted from each other by 120°.

17. An electric motor for driving a load comprising:
a stator assembly including a stator having a plurality of lobes.., the stator including at least one coil wound about at least one of the plurality of lobes, each coil having a pair of input leads;

a rotor assembly including a magnet having a plurality of poles, the magnet adapted to be coupled to the load and rotatably positioned relative to the stator assembly;

means for electrically connecting the leads of the at least one coil to form an input terminal, the rotor assembly rotating relative to the stator assembly in response to a substantially continuously variable electrical signal applied to the input terminal to angularly position the rotor assembly to any one of a plurality of positions independent of stator geometry; and a layer of insulating material having electrical conductors formed thereon, the stator being fixedly secured to the layer and wherein the electric motor further comprises a piezoelectric transducer electrically connected to the conductors and disposed between the rotor assembly and the layer of insulating material, said piezoelectric transducer being responsive to the flow of electrical energy to supply pressure to said rotor assembly thereby supplying a braking force to said rotor assembly.

18. A method for controlling an electric motor for driving a load, the electric motor having a stator assembly and a rotor assembly for rotating relative to the stator assembly, the method comprising the steps of:
providing a braking surface;
providing the stator assembly with a magnetic permeability center offset from its electromagnetic center;
energizing one of the two assemblies with at least one substantially continuously variable electrical signal thereby producing an axial force between the two assemblies to move the rotor assembly away from the braking surface and producing a rotational force to rotate the rotor assembly to a desired position; and deenergizing the one assembly thereby allowing the rotor assembly to move against the braking surface to hold the rotor assembly at the desired location.

19. The method of claim 18 further comprising the steps of:

generating an angular position signal representative of the desired position;

generating a reference signal representative of a second position;

providing a range of positions including the desired position, the range of positions being representative of the deadband of the motor;

processing the signals to obtain a processed signal and preventing rotation of the rotor assembly from the desired position to the second position when the second position is within the range based on the processed signal.

20. A method of assembling a miniature motor for accurately rotating a load to a desired angular position in response to a sensor signal to a substrate having electrical conductors formed thereon, the method comprising the steps of:

forming a stator core from a plurality of laminations, the stator core having a plurality of lobes;

winding at least one coil about an associated stator lobe, the at least one coil having a pair of leads;

providing coil connector means positioned between the motor and the substrate, the coil connector means including a plurality of terminations;

electrically connecting the leads of the at least one coil to an associated coil connector means termination;

fixedly attaching the coil connector means to the substrate such that the coil connector means is electrically coupled to the electrical conductors;

magnetizing a permanent magnet with a magnetic flux having an amplitude which varies substantially sinusoidally with angular position, the magnet surrounding the stator core; and providing a rotor including the permanent magnet surrounding the stator core for rotation relative thereto, in response to a substantially continuously variable electrical signal applied to the electrical conductors.

21. The method of claim 20 wherein the coil connector means is a commutator.

* * * * *

UNITED STATES PATENT AND TRADEMARK OFFICE
CERTIFICATE OF CORRECTION

PATENT NO. : 5,355,373
DATED : October 11, 1994
INVENTOR(S) : MICHAEL E. SALMON et al.

It is certified that error appears in the above-identified patent and that said Letters Patent is hereby corrected as shown below:

Column 5, Line 12

Delete "13.0" and insert --130--.

Column 5, Line 51

After "coils" delete . (period).

Column 5, Line 63

After "although" delete - (hyphen).

Column 6, Line 9

Delete "10A" and insert --10Ω--.

Column 8. Line 25

Delete "68" and insert --168--.

UNITED STATES PATENT AND TRADEMARK OFFICE
CERTIFICATE OF CORRECTION

PATENT NO. : 5,355,373
DATED : October 11, 1994
INVENTOR(S) : MICHAEL E. SALMON et al.

It is certified that error appears in the above-identified patent and that said Letters Patent is hereby corrected as shown below:

Column 8, Line 68

Delete "72" and insert --172--.

Column 9, Line 56

After "D" insert . (period).

Column 10, Line 46

Delete "starer" and insert --stator--.

UNITED STATES PATENT AND TRADEMARK OFFICE
CERTIFICATE OF CORRECTION

PATENT NO. : 5,355,373

DATED : October 11, 1994

INVENTOR(S) : Michael E. Salmon, et al

It is certified that error appears in the above-indentified patent and that said Letters Patent is hereby corrected as shown below:

Column 14, Line 14
After "graph" insert . (period).

Signed and Sealed this

Fourteenth Day of March, 1995

Attest:

BRUCE LEHMAN

*Attesting Officer*  *Commissioner of Patents and Trademarks*